(12) United States Patent
Forster et al.

(10) Patent No.: US 6,227,809 B1
(45) Date of Patent: *May 8, 2001

(54) METHOD FOR MAKING MICROPUMPS

(75) Inventors: Fred K. Forster; Ron L. Bardell, both of Seattle; Nigel R. Sharma, Bothell, all of WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/192,078

(22) Filed: Nov. 13, 1998

Related U.S. Application Data

(63) Continuation-in-part of application No. 08/401,546, filed on Mar. 9, 1995, now Pat. No. 5,876,187.
(60) Provisional application No. 60/065,725, filed on Nov. 14, 1997.

(51) Int. Cl.⁷ .............................. F04B 19/24; F04B 17/00

(52) U.S. Cl. ........................................ 417/53; 417/413.2

(58) Field of Search .................................. 417/53, 413.2, 417/322

(56) References Cited

U.S. PATENT DOCUMENTS

| 1,329,559 | 2/1920 | Tesla . |
| 2,856,962 | 10/1958 | Christoph . |
| 3,068,880 | 12/1962 | Riordan . |

(List continued on next page.)

FOREIGN PATENT DOCUMENTS

| 1418274 | 12/1975 | (SE) . |
| WO 94/19609 | 9/1994 | (WO) . |
| WO 96/00849 | 6/1995 | (WO) . |

OTHER PUBLICATIONS

Bloomstein, T.M. and Ehrlich, D.J. (1992), "Laser–Chemical Three–Dimensional Writing for Microelectromechanics and Application to Standard–Cell Microfluidics," J. Vac. Sci. Technol. B 10(6):2871–2874.

Forster, F.K. et al. (1995), "Design, Fabrication and Testing of Foxed–Valve Micro–Pumps," Proc. of the ASME Fluids Engineering Division, 1995 ASME Int'l Mechanical Engineering Congress and Exposition, San Francisco, CA, Nov. 12, 17, 1995, FED–vol. 234, ASME 1995, pp. 39–44.

Gerlach, T. et al. (1995), "A new micropump principle of the reciprocating type using pyramidic micro flowchannels as passive valves," J. Micromech. Microeng. 5:199–201.

Gerlach, T. and Wurmus, H. (1995), "Working principle and performance of the dynamic micropump," Sensors and Actuators A 50:135–140.

Gosh, J. (Apr. 1990), "Tiny Just Got Smaller," Electronics, pp. 137–138.

Olsson, A. et al. (1997), "Micromachined Flat–Walled Valveless Diffuser Pumps," J. Microelectromech. Syst. 6(2):161–166.

Olsson, A. et al. (1995), "A valve–less planar fluid pump with two pump chambers," Sensors and Actuators A 46–47:549–556.

(List continued on next page.)

*Primary Examiner*—Charles G. Freay
(74) *Attorney, Agent, or Firm*—Greenlee, Winner and Sullivan, P.C.

(57) ABSTRACT

This invention provides a method by which the performance of reciprocating NMPV (No-Moving-Parts-Valve) micropumps can be optimized for a given choice of valve design, e.g. for diffuser/nozzle valves, rectifier valves etc. The method can more generally be used to design and produce NMPV micropumps with structures optimized for maximal pump performance. The method can further be used to design and construct NMPV pumps significantly smaller in size than those currently available to the art without significant loss in pump performance.

31 Claims, 15 Drawing Sheets

U.S. PATENT DOCUMENTS

| | | |
|---|---|---|
| 3,191,623 | 6/1965 | Bowles . |
| 3,375,842 | 4/1968 | Reader . |
| 3,412,745 | 11/1968 | Kelley . |
| 3,459,206 | 8/1969 | Dexter . |
| 3,461,897 | 8/1969 | Kwok . |
| 3,472,256 | 10/1969 | Hartman . |
| 3,472,258 | 10/1969 | Blosser, Jr. . |
| 3,480,030 | 11/1969 | Bermel . |
| 3,481,353 | 12/1969 | Hatch, Jr. . |
| 3,534,754 | 10/1970 | Beeken . |
| 3,552,414 | 1/1971 | Sutton . |
| 3,554,209 | 1/1971 | Brown et al. . |
| 3,570,511 | 3/1971 | Bermel . |
| 3,604,442 | 9/1971 | Tucker . |
| 3,654,946 | 4/1972 | Wieme . |
| 3,752,187 | 8/1973 | Retallick . |
| 3,798,727 | 3/1974 | Brock . |
| 3,942,558 | 3/1976 | Honda et al. . |
| 4,068,144 | 1/1978 | Toye . |
| 4,188,977 | 2/1980 | Laakaniemi et al. . |
| 4,441,526 | 4/1984 | Taft et al. . |
| 4,512,371 | 4/1985 | Drzewiecki et al. . |
| 4,716,935 | 1/1988 | Srour et al. . |
| 4,830,053 | 5/1989 | Shaw . |
| 4,892,294 | 1/1990 | Kagstrom ............................. 266/233 |
| 5,197,517 | 3/1993 | Perera . |
| 5,265,636 | 11/1993 | Reed . |
| 5,277,556 * | 1/1994 | Van Lintel ........................ 417/413.2 |
| 5,466,932 * | 11/1995 | Young et al. ........................ 250/289 |
| 5,876,187 * | 3/1999 | Forster et al. .................... 417/413.2 |

OTHER PUBLICATIONS

Olsson, A. et al. (1995), "A Valve–Less Planar Pump in Silicon," The 8$^{th}$ Int'l. Conf. on Solid–State Sensors and Actuators and Eurosensors. IX. Stockholm, Sweden, Jun. 25–29, 1995, 305—B7, pp. 291–294.

Olsson, A. et al. (1996), "Diffuser–element design investigation for valve–less pumps," Sensors and Actuators A 57:137–143.

Olsson, A. et al. (1996), "A valve–less planar pump isotropically etched in silicon," J. Micromech. Microeng. 6(1):87–91.

Olsson, A. et al. (1996), "An Improved Valve–Less Pump Fabricated Using Deep Reactive Ion Etching," IEEE, The Ninth Annual Int'l Workshop on Micro Electro Medchanical Systems, (Cat. No. 96CH35856), pp. 479–484.

Robinson, G.M. (1992), "Silicon Micropump Replaces Bulky Insulin System," Design News, pp. 109–110.

Stemme, E. and Stemme, G. (1993), "A Valveless Diffuser/Nozzle–Based Fluid Pump," Sensors and Actuators A 39:159–167.

Stemme, G. (1995), "Micro Fluid Sensors and Actuators," Sixth Int'l Symp. on Micro Machine and Human Science, pp. 45–52.

Van Lintel, H.T.G. et al. (1988), "A Piezoelectric Micropump Based on Micromachining of Silicon," Sensors and Actuators 15:153–167.

* cited by examiner

METHOD FOR MAKING MICROPUMPS

CROSS-REFERENCE TO RELATED APPLICATIONS

This application claims priority under 35 U.S.C. §119(e) to U.S. provisional application Ser. No. 60/065,725, filed Nov. 14, 1997, and is a continuation in part of U.S. patent application Ser. No. 08/401,546, filed Mar. 9, 1995 now U.S. Pat. No. 5,876,187. Both of these applications is incorporated by reference herein to the extent that they are not inconsistent with the disclosure herein.

FIELD OF THE INVENTION

The invention relates generally to micropumps or micromachined pumps and more particularly to such pumps that are reciprocating pumps operating without the use of valves that open and close, i.e., pumps that employ no-moving-parts valves (NMPVs). The invention relates in particular to micropumps having pump cavities with diameters of less than 6 mm and provides a method for making such pumps with improved performance characteristics. The invention also relates in particular to micropumps optimized for pumping incompressible fluids. The invention also provides NMP valve designs for use in NMPV micropumps and micromachined pumps.

BACKGROUND OF THE INVENTION

Miniature pumps, hereafter referred to as micropumps, can be constructed using fabrication techniques adapted from those applied to integrated circuits. Such fabrication techniques are often referred to as micromachining. Micropumps are in great demand for environmental, biomedical, medical, biotechnical, printing, analytical instrumentation, and miniature cooling applications. Just as in larger-scale applications, various pump designs are required for different micropump systems. For certain applications in which space is at a premium, pumps with minimal dimensions, particularly pump cavity dimensions, are of interest. Reduced-dimension pumps which substantially maintain performance levels of larger dimension pumps are particularly desirable.

Micropumps may include active, passive or fixed valves. Active valves have components that are actuated or otherwise driven or moved and include, for example, solenoid-actuated valves or magnetically or electrostatically driven control valves. Passive valves also have movable parts as exemplified by movable polysilicon check valves. Both passive and active valves have limited effectiveness when used to pump fluids containing particulates. These valves can become obstructed or fail to seal when particulates are present.

Fixed valves are valves having no moving parts (no-moving-parts valves, NMPVs) and represent the utmost simplicity and high reliability for pumping fluids. Such valves, which do not include parts that periodically seal and move apart, are especially advantageous for micropump systems used for pumping fluids that include particulates, for example liquids that contain particles. Fixed-valve pumps are particularly useful for biological applications that require pumping fluids that contain cells. A mechanism exists for cell damage in moving-parts valves that is not present in pumps with fixed valves. Smaller diameter pump cavities and valve conduits (sized from 10's to 100's of $\mu$m) of NMPV micropumps can be produced by application of etching techniques in silicon wafers and by application of micromolding techniques for fabrication of micropumps from a variety of plastics or related materials.

The effectiveness of fixed valves can be characterized by the parameter "diodicity," which is the ratio of pressure drop in the reverse-direction fluid flow through the valve to the pressure drop in the forward-direction fluid flow through the valve, for a given flow rate. A basic design consideration for a fixed-valve micropump is valve configurations that result in a diodicity greater than 1.0. In this regard, the small size of such valves, and the very low flow range (from 100's of nL/min to 1,000's of $\mu$L/min, for example) will typically yield a relative low Reynolds number (less than about 200–400) which is a dimensionless parameter that is proportional to the product of the valve size and flow velocity and inversely proportional to the kinematic viscosity of the fluid. Accordingly, valve configurations for use in micropumps must effect the requisite diodicity in flows characterized by low Reynolds numbers, where turbulence (with attendant significant pressure losses) is unlikely to occur.

Several fixed valve configurations have been demonstrated to function in low Reynolds number micropumps. Stemme and collaborators have reported a planar double chamber pump with diffuser/nozzle valves fabricated in silicon using an isotropic HNA-etch (A. Olsson et al. (1995) "A valve-less planar pump in silicon," 8th Int'l Conference on Solid- State sensors and Actuators-Eurosensors IX, Digest of Technical Papers (IEEE Cat. No. 95TH8173) vol. 2 P.291–294, Found. Sensors & Actuator Technol., Stockholm, Sweden; A. Olsson et al. (1996) "A valve-less pump isotropically etched in silicon," J. Micromech. and Microeng. (UK) 6(1):87–91; G. Stemme (1995) "Microfluid sensors and actuators," Proceedings of the Sixth Int'l Symposium on Micro Machine and Human Science, p. 45–52, IEEE New York, N.Y.) A maximum pump capacity of 230 $\mu$l/min and maximum pump pressure of 1.7 m $H_2O$ were reported for a diffuser/nozzle pump with 6 mm diameter pump chamber operated for pumping methanol at a resonance frequency of 1318 Hz. The same group later reported a similar two-chamber (6 mm diameter) micropump with diffuser/nozzle valves fabricated using deep reactive ion etching (DRIE) with a maximum pump pressure of 7.6 m $H_2O$ and maximum pump flow of 2.3 ml/min for water (A. Olsson et al. (1996) "An improved valve-less pump fabricated using deep reactive ion etching," Proceedings IEEE The Ninth Annual Int'l Workshop on Micro Electro Mechanical Systems, (Cat. No. 96CH35856) p. 479–484, IEEE New York, N.Y.; A. Olsson et al. (1997) "Micromachined flat-walled valveless diffuser pumps," J. Micromech. Systems 6(2):161–166). WO 94/19609, (Stemme and Stemme) pub. September 1994, relates to diaphragm displacement pumps employing diffuser/nozzle valves.

The Stemme et al. group had earlier reported single chamber and double chamber minipumps employing diffuser/nozzle valves fabricated in brass (G. Stemme et al. (1993) "A valveless diffuser/nozzle-based fluid pump," Sensors and Actuators A A39(2): 159–167; A. Olsson et al. (1995) "A valve-less planar fluid pump with two pump chambers," Sensors and Actuators A A47 (1–3):549–556.

T. Gerlach et al. (1995) "A new micropump principle of the reciprocating type using pyramidic micro flowchannels as passive valves," J. Micromechan. Microengin, 5(2):199–201 reports a micropump using direction-dependent fluid dynamic behavior as dynamic passive valves. Pyramid-shaped microchannels (narrowest d=123 $\mu$m with length= 370 $\mu$m) and a 10 mm×10 mm×(0.4–0.75) mm pump chamber are fabricated by anisotropic KOH etching in a silicon wafer. The authors report a pump flow rate of 260 $\mu$L/min when the pump is operated in a "quasi-static" mode at frequencies of 100 Hz to 1 Hz and report a pump flow rate of 480 µL/min when the pump is operated at a frequency of 8 kHz. T. Gerlach et al. (1995) Sensors and Actuators A A50(1–2):135–140;WO 96/00849, (Gerlach et al.) pub. January 1996, relates to micropumps employing pyramid-shaped microchannels as valves.

Forster et al. (1995) "Design, fabrication and testing of fixed-valve micro-pumps," Proceedings of the ASME Fluids Engineering Division 1995 ASME Int'l Mechanical Engineering Congress and Exposition FED-Vol. 234 p.39–44 reports micropumps with NMPV valves etched on silicon wafers. Two types of valves were tested: diffuser/nozzle valves and valvular conduits (also called fluid rectifiers) with branched channels which have more restricted flow in one direction in the valve. Valvular conduits for high Reynolds number systems are described in U.S. Pat. No. 1,329,559 (Tesla) and U.S. Pat. No. 5,265,636 (Reed). U.S. patent application Ser. No. 08/401,546, filed Mar. 9, 1995 (Afromowitz et al. ) is, among other things, directed to micropumps with NMPVs. This application describes diffuser/nozzle valves, valvular conduits and conduits with curved sidewalls for redirecting reverse flow which all function as NMPVs.

The present invention is generally directed to methods of fabrication of improved micropumps that employ fixed inlet and outlet valves and to micropumps with improved performance and characteristics compared to those currently known in the art.

SUMMARY OF THE INVENTION

This invention provides a method by which the performance of reciprocating NMPV (No-Moving-Parts-Valve) micropumps can be optimized for a given choice of valve design, e.g. for diffuser/nozzle valves, rectifier valves etc. The method can more generally be used to design and produce NMPV micropumps with structures optimized for maximal pump performance. The method can further be used to design and construct NMPV pumps significantly smaller in size than those currently available to the art without significant loss in pump performance.

Most generally, the pumps of this invention have a pump cavity with top and bottom surfaces and a depth which define a cavity volume. At least one of the top or bottom surfaces of the cavity is a deformable diaphragm. The pump also has at least one inlet and at least one outlet valve which each no-moving-parts valves (NMPV) in fluid communication with the pump cavity. The inlet valve is a conduit that is shaped, as will be described in more detail below, with flow restricted less in the direction toward the pump cavity than away from the pump cavity. The outlet valve is a conduit that is shaped, again as will be described below, with flow less restricted in the direction away from the pump cavity than toward the pump cavity. The flow behavior of such valves is characterized by a property called diodicity which is the ratio of the pressure drop in the "reverse" (or hard) direction to that of the "forward" (or easy) direction for a given flow rate.

An actuator is attached or fixed to the diaphragm such that application of a periodic voltage to the actuator causes the diaphragm to deform periodically to change the volume of the cavity. The actuator can, for example, be a piezoelectric element (PZT), such as lead zirconate titanate, that causes the diaphragm to periodically bend in a "bimorph" fashion when a periodic voltage is applied across the PZT. With the inlet valve less restricted to flow moving in to the pump cavity and the outlet valve less restricted to flow moving out of the pump cavity, a net flow from the inlet, through the cavity into the outlet valve develops when the pump cavity volume is periodically changed. It is preferred to operate the pump at a resonance frequency.

Pump cavities of this invention preferably have planar top and bottom surfaces that are circular, i.e., the cavities are circular disk-shaped cavities. The size of such pump cavities is defined by a depth and a diameter. Inlet and outlet valves preferably join the pump cavity at the periphery of the cavity. Most preferably, in the micropumps of this invention, the pump cavity and the inlet and outlet valves is formed in silicon or a related material by etching. A variety of etching methods can be employed that produce curved steep walls, such as deep reactive ion etching (DRIE) methods. Actuators are typically disk-shaped and preferably are sized to extend over about 25% to about 95% of the surface of the diaphragm over the pump cavity. For circular pump cavities, the diameter of the actuator is about 50% to about 95% of the diameter of the pump cavity. The actuator is preferably positioned on the diaphragm centered over the pump cavity.

The top or bottom diaphragm of the pump cavity can be formed by overlaying a pump cavity with a glass plate or other deformable material. In a pump cavity etched in silicon, for example, a glass plate or other deformable material can be bonded to the silicon to form a top or bottom surface and diaphragm of the cavity. The deformable diaphragm can also be the silicon surface at the bottom of the pump cavity. Alternatively, both the top and bottom surfaces of the pump cavity can be deformable diaphragms, for example one can be a silicon diaphragm and the other an overlying glass diaphragm. The pump diaphragm is characterized by its thickness and breadth (breadth is used generically herein to describe the size of the diaphragm which can be designed to have a variety of shapes, for example, in a circular disk diaphragm breadth is the diameter of the circular disk) and its mass which depends upon size and the material (glass, silicon, metal, etc.) from which it is made.

In general the method of the invention allows optimization of pump performance for a given valve configuration by adjusting structural parameters including cavity shape, cavity size (e.g., cavity diameter), diaphragm material, diaphragm thickness, diaphragm breadth, piezoelectric transducer thickness and diameter (relative to cavity diameter) and the like. The method also allows optimization of pump performance for type of fluid pumped, e.g., for pumping of an incompressible fluid. The method also allows determination of the resonance frequency or frequencies of a pump having a given structure to allow selection of optimal operating frequencies for the pump diaphragm.

In a specific embodiment, the method of the invention allows optimization of pump performance for a given valve configuration by adjusting the stiffness and/or mass of the pump diaphragm. Stiffness is adjusted, for example, by appropriate selection of diaphragm breadth and thickness for a given valve configuration, a given diaphragm material and with other pump parameters kept constant. Changes in stiffness of the diaphragm can result in changes in the pump resonance frequency and changes in performance at the resonance frequency. In general, increasing the stiffness of the diaphragm results in a higher resonance frequency and higher gain at the resonance frequency. Increasing diaphragm stiffness, for example by increasing the diaphragm thickness while holding the pump cavity diameter constant results in a higher pump resonance frequency and relatively less damping which can result in higher performance at the resonance frequency.

The invention provides a linear systems model which consists of a number of equations which allow calculation of parameters, e.g., Qo and/or $P_C$ characteristic of pump performance. Design parameters are selected and introduced directly or indirectly into those equations and performance characteristics are calculated. One or more design parameters can be optimized to obtain desired pump performance, e.g., one or more design parameters can be selected to optimize pump performance. For example, the model can be employed to determine for a pump of given diameter, the thickness of diaphragm that will give optimal performance. The model can also be employed to determine for a given diaphragm thickness, the pump cavity diameter that will give optimal performance with other pump parameters held constant This invention demonstrates that, contrary to expectations in the art, pump size (pump cavity diameter) can be significantly decreased, e.g., made significantly less than 6 mm, without significant loss of pump performance by appropriate selection of diaphragm material and thickness. This invention provides micropumps with diameters significantly less than 6 mm, including those with diameters down to 0.5 mm. Micropumps with pump cavity diameters less than about 5 mm to about 0.5 mm can also be provided using the methods herein. Micropumps with pump diameters less than about 3 mm to about 0.5 mm and micropumps with diameters ranging from about 1 mm to about 0.5 mm can be provided using the methods herein.

As a further aspect of the invention, this work has demonstrated that NMPV reciprocating micropumps can exhibit multiple frequency resonance peaks where the frequency is the excitation frequency of the actuator. The lower frequency (the chamber resonance) relates to fluid compliance, the valve configuration and diaphragm stiffness. The higher frequency resonance (the diaphragm resonance) is more closely associated with free-air resonance of the cover plate assembly of the pump. This invention also provides a method for operating a NMPV micropump at the diaphragm resonance frequency to achieved improved pump performance.

Additional features and advantages of the invention will be more readily apparent from the following detailed description and by reference to the drawings.

BRIEF DESCRIPTION OF THE FIGURES

FIG. 4A shows a diffuser/nozzle valve. FIGS. 4B–E show several valves combining curved and straight conduits, the easy direction for flow in these valves is from lower left to upper right. These valves can be also be linked in series as indicated in FIG. 4F.

DETAILED DESCRIPTION OF THE INVENTION

Figure 1:
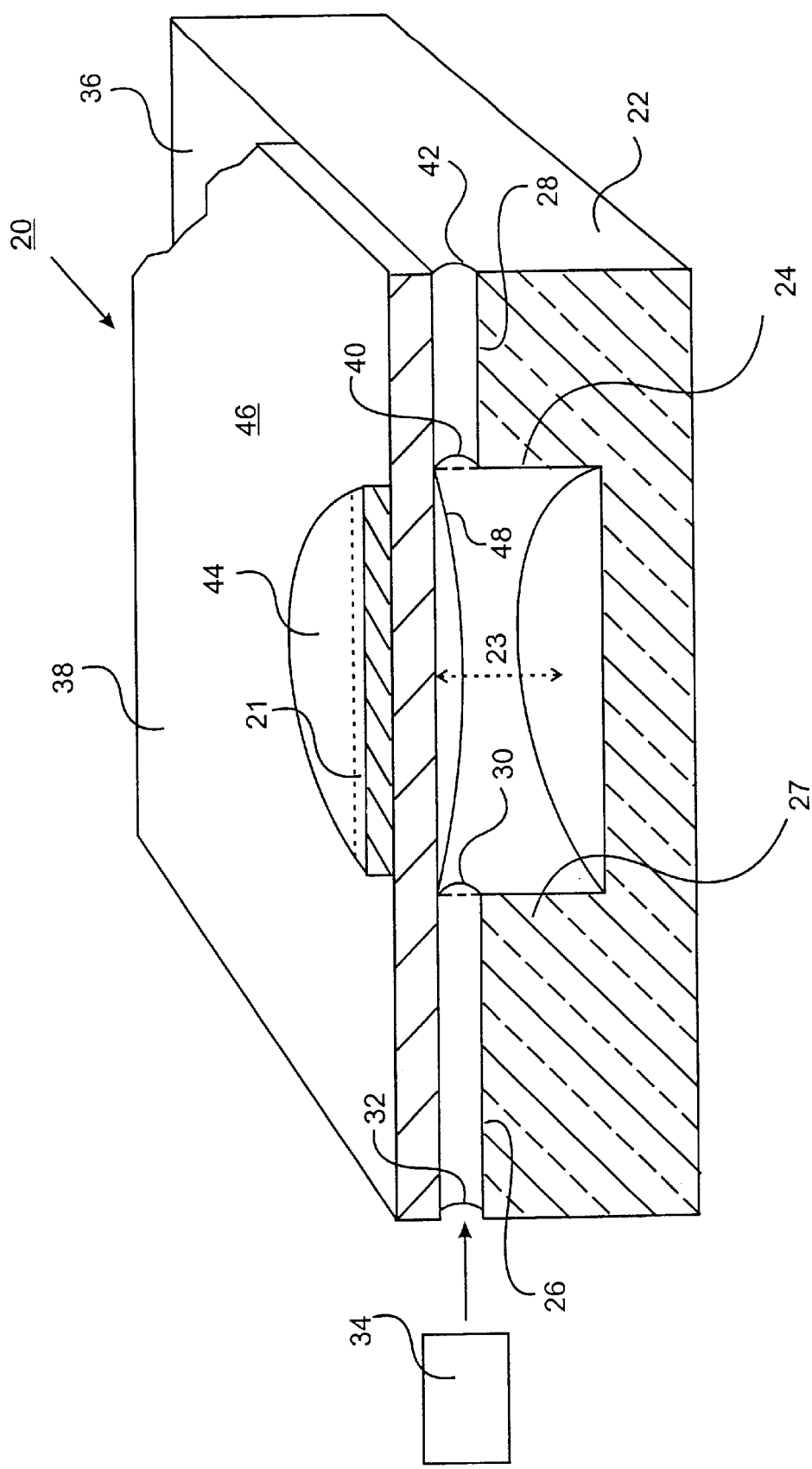
FIG. 1 is a schematic cross-sectional view of a micromachined pump with fixed valves.

FIG. 1 is a schematic cross-sectional view of a reciprocating micromachined pump with NMPV. The pump 20 includes a base 22, which is preferably a silicon or polysilicon material. A pump cavity 24 is formed in the base. The illustrated pump cavity is cylindrical in shape and its volume is defined by a pump cavity diameter 21 and a depth 23. The pump cavity is closed by positioning a glass cover plate 38 over the surface 36 of the silicon base. The glass cover plate can be employed as the pump diaphragm. Other configurations are possible. For example, the valves and/or the cavity can be formed by etching the glass and/or silicon, so that either or both can act as a diaphragm.

An inlet valve 26 and an outlet valve 28 are also formed in the base. Both of these valves are conduits shaped such that fluid flow is less restricted in one direction along the conduit than in the other direction along the conduit. The illustrated inlet and outlet valves are shown schematically. Preferred valve shapes will be discussed below. The inlet valve 26 is connected(e.g., in fluid communication) at an inner end 30 with the pump cavity, preferably at the sidewall 27 of the cavity. The outer end 32 of the inlet valve is connected to a fluid source 34 or reservoir. The outlet valve 28 has an inner end 40 connected to the pump cavity and an outer end 42. The outer end of the outlet valve is available for connection to apparatus, fluid channels or the like to which fluid flow is to be delivered by the pump. The inlet 26 and outlet 28 valves are formed in the base when it is covered by the glass cover plate 38. The cover plate 38 is bonded to the surface 36 of the base 22.

The diaphragm actuator is illustrated in FIG. 1 as a piezoelectric disk 44 mounted to the outer surface 46 of the cover plate (i.e., the diaphragm) overlying the center of the pump cavity 24. The disk can be bonded to the diaphragm using conductive silver epoxy. A voltage supply is provided to the piezoelectric disk (not shown) to actuate and deform it and thereby to cause a deformation of the diaphragm of the pump cavity and to thus change the volume of the pump cavity, as indicated by the dashed line 48 which represent the deflection of the diaphragm. Reducing the volume of the cavity by inward deflection of the diaphragm tends to pump fluid from the cavity into the valves. The return of the diaphragm to its original non-deflected position tends to draw fluid from the valves into the pump cavity. Application of a periodic voltage to the attached PZT results in periodic deflection of the diaphragm and periodic volume change in the pump cavity.

The inlet valve 26 is an NMPV with flow restricted less in the direction toward the pump. The outlet valve 28 is an NMPV with flow less restricted in the direction away from the pump cavity. With such valves in place, periodic volume change in the pump cavity tends to pump fluid from the inlet valve through the pump cavity and through the outlet valve. The direction of flow toward the pump cavity in the inlet valve, but away from the pump cavity in the outlet valve, is designated the forward direction (left to right in FIG. 1). The reverse direction of flow is designated as the direction of flow away from the pump cavity in the inlet valve and toward the pump cavity in the outlet valve. For use in further describing flow in the NMPV, relative positions along the conduit in the direction of flow are designated as downstream, while relative positions along the conduit against the direction of flow are designated as upstream. As a result of using the NMPV configuration, as indicated, the pressure drop for the reverse direction flow is greater than the pressure drop for the forward direction flow and the diodicity of the pump with its valves is greater than 1.0 and net flow in the pump is in the forward direction.

Figure 2A:
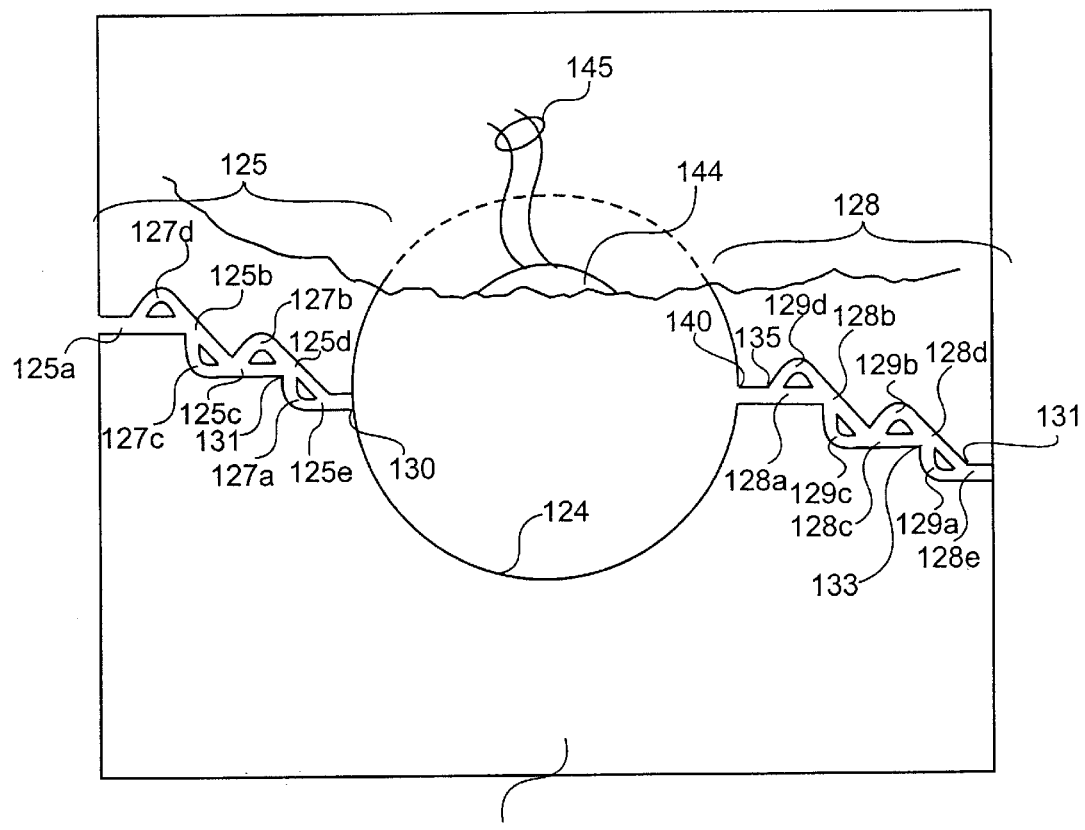
FIG. 2A is a top plan diagram of a micromachined pump with fixed valves, illustrating fluid rectifying valves.
Figure 2B:
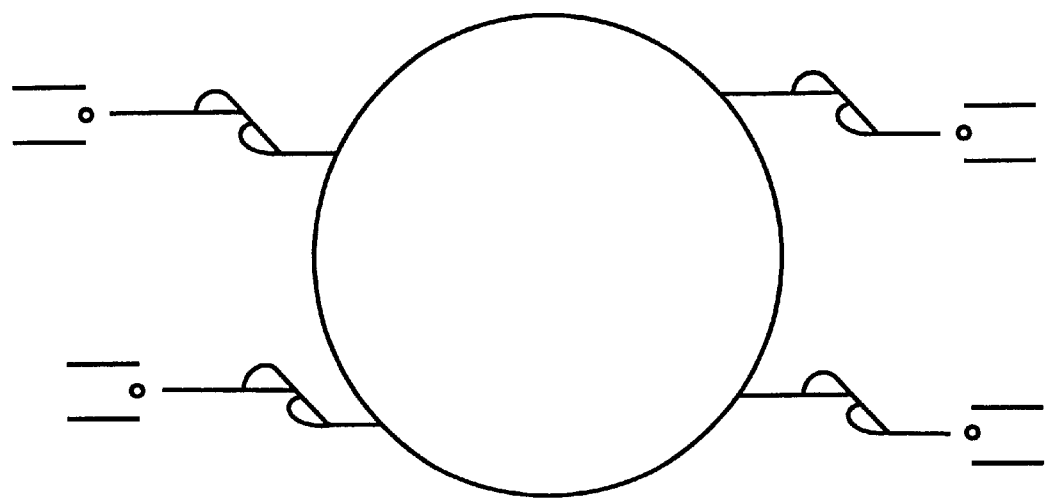
FIGS. 2B and 2C are top plan diagrams of micromachined pumps with fixed valves, illustrating the use of more than one inlet valve and more than one outlet valve.

FIG. 2A is a schematic top view of an example micropump of this invention indicating shaped conduits as inlet 126 and outlet 128 valves. The drawings of the valves are reproductions of masks used in a silicon etching process for forming the pump cavity and valves and illustrates valve shape. FIG. 2B illustrates the combination of more than one inlet and more than one outlet valve in pump configurations. Multiple inlet and outlet valves are configured in a parallel arrangement.

Micromachined pumps of this invention employ fixed valves, also called no-moving-parts valves (NMPV). As indicated above, several types of NMPV have been demonstrated to function in low Reynolds number micropumps. Of particular interest for the micropumps of this invention are the NMPV described in U.S. patent application Ser. No. 08/401,546 filed Mar. 9, 1995 which description is incorporated by reference in its entirety herein. Briefly, three types of NMPV are described therein: diffuser/nozzle valve configurations, fluid rectifier valves comprising a conduit with discrete branches for redirecting reverse flow and valve conduits with curved sidewall portions for redirection of reverse flow.

FIG. 2A illustrates fluid rectifier valves. Inlet valve 126 is connected to pump cavity 124 and comprises a trunk conduit 125 extending from the inner end 130 to the outer end 132 of the valve. The trunk conduit carries forward flow and is a contiguous series of conduit portions 125a–e, each of which is generally straight. The conduit portions are joined along the trunk conduit at an angle that deviates from 180° (i.e., the trunk conduit deviates from a straight line path). The inlet fluid rectifier valve also comprises discrete branches 127a–d for redirecting reverse flow in the valve. These branches extend from the trunk conduit and rejoin the trunk branch at a position downstream (in the sense of reverse flow) of where the branch began and thus function to divert reverse flow in the valve. The branches typically extend from a joint (e.g., 131) between two trunk conduit portions and are angled with respect to the trunk conduit to receive reverse flow. The branches are oriented such that forward flow substantially bypasses them proceeding along the generally straight path of the trunk conduit. The branches are typically curved to allow rejoinder to the trunk conduit. The forward path of flow in the inlet valve is defined by the trunk conduit. Reverse flow is diverted into the branches 127a–d which increases the pressure drop along the reverse flow direction. Overall flow momentum in the inlet valve is directed in the forward direction.

As also shown in FIG. 2A, the outlet valve 128 is shaped in an analogous manner to the inlet valve with a contiguous series of conduit portions 128a–e forming the trunk conduit and defining the path of forward flow (in this case away from the pump cavity) in the conduit. Branches 129a–d extend from the trunk conduit for redirecting reverse flow in the valve. These branches extend from the trunk conduit and rejoin the trunk branch at a position downstream (in the sense of reverse flow) of where the branch began and thus function to divert reverse flow in the valve. The branches typically extend from a joint (e.g., 131) between two trunk conduit portions and are angled with respect to the trunk conduit to receive reverse flow. The branches are oriented such that forward flow substantially bypasses them proceeding along the generally straight path of the trunk conduit. The branches are typically curved to allow rejoinder to the trunk conduit. The forward path of flow in the inlet valve is defined by the trunk conduit. Reverse flow is diverted into the branches 129a–d which increases the pressure drop along the reverse flow direction. Overall flow momentum in the inlet valve is directed in the forward direction in this case away from the pump cavity and out the outlet valve.

Periodic deformation of the pump diaphragm causes the pump to alternate between a pumping mode and a suction mode. In the pumping mode, fluid in the cavity is forced out of the cavity and into the valves. In the suction mode, fluid is drawn into the cavity from the valves. With the NMPV in place as indicated in FIG. 2A there is a net flow in the forward direction out of the outlet valve and in the suction mode there is a net flow in the forward direction out of through the inlet valve into the pump.

Figure 2C:
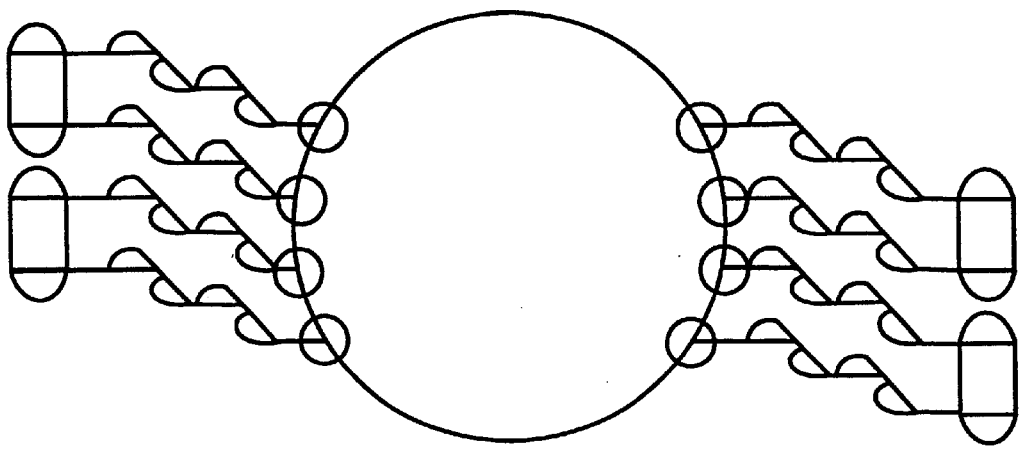

For the fluid rectifier valves of FIG. 2A, the number of branches in the valve can be varied without destroying the function of the valve. Furthermore, the joinder angle of conduit portions along the trunk conduit path can be varied without loss of valve function. The joinder angle is less than 180° and valve configurations include those where the angle can be 20° or more, 45° or more or 90° or more. FIGS. 2B and 2C also illustrates the use of rectifier valves analogous to those in FIG. 2A.

Figure 3A:
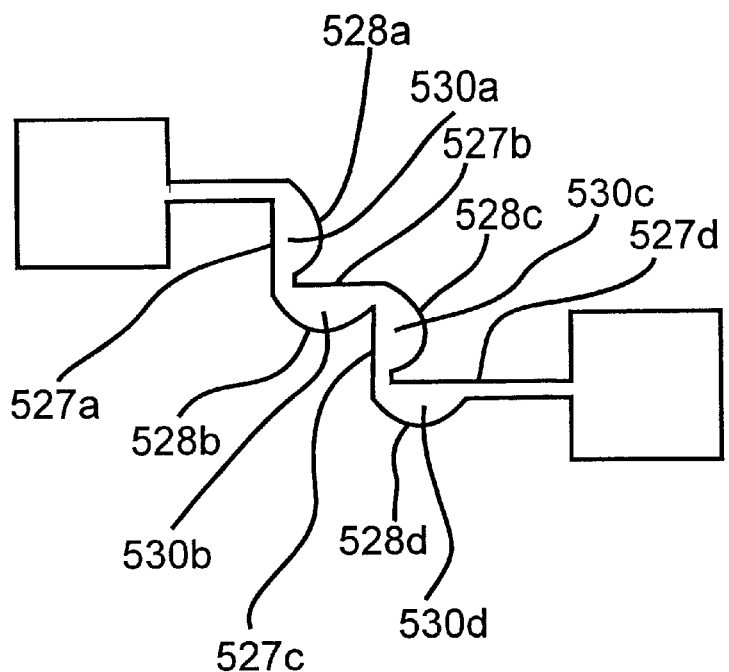
FIGS. 3A and 3B illustrate alternative NMPV shapes. Valve shape is indicated as mask outlines that would be used in certain silicon etching processes. The valves shown have geometries in which the forward flow path is primarily defined by the straight sidewall portions of the conduit and reverse flow is primarily defined by the curved sidewall portions of the conduit.
Figure 3B:
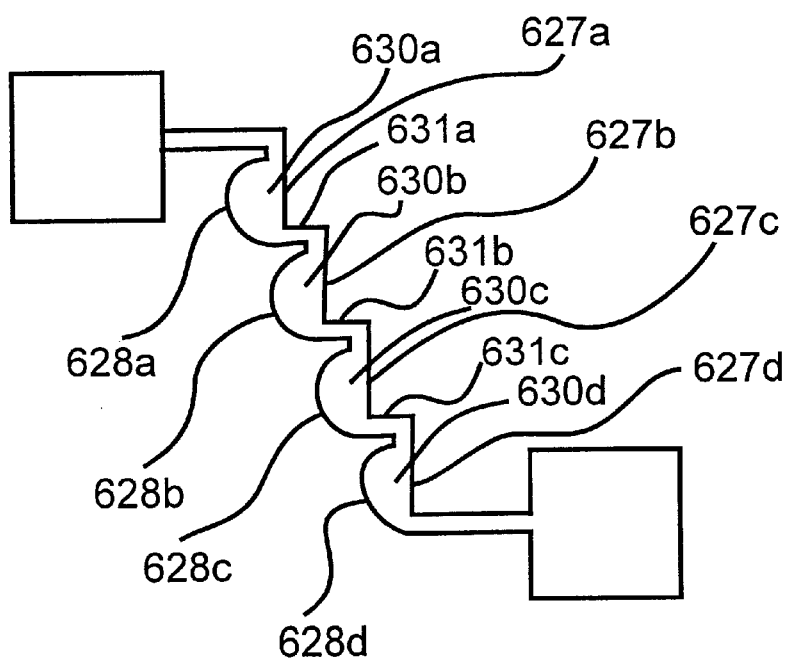

FIGS. 3A and 3B illustrate alternative NMPV shapes. Valves 526 (FIG. 3A) and 626 (FIG. 3B) have geometries in which the forward flow path is primarily defined by the straight sidewall portions (527a–d and 627a–d) of the conduit and reverse flow is primarily defined by the curved sidewall portions (528a–d, and 628a–d)of the conduit. In both cases, the valve comprises contiguous portions 530a–d and 630a–d with intervening straight portions 631a–c. In valve 526 each conduit portion has a straight sidewall and a curved sidewall. In valve 526, conduit portions are illustrated as joined at an angle of about 90° and the curved sidewalls of sequential conduit portions are on opposite sides of the conduit along the length of the valve. In valve 626, conduit portions 630 can have a straight sidewall 627a–f and a curved sidewall 628a–d. Conduit portions are joined such that the curved sidewalls of the conduit portions are on the same side of the conduit. Conduit portions are joined through an intermediate generally straight portion 631a–c. Each conduit portion 630 is joined at an angle of about 90° to the generally straight 631 portion. The arrangement of conduit portions with straight and curved sidewalls in these valves results in higher pressure loss in the reverse direction (right to left in the figure) than in the forward direction (left to right in the figure). As with the rectifier valves of FIG. 2, the joinder angle between conduit portions in the curved sidewall valve of FIGS. 3A and B can be varied without loss of function. The preferred joinder angle is from about 80–100°.

Figure 4A:
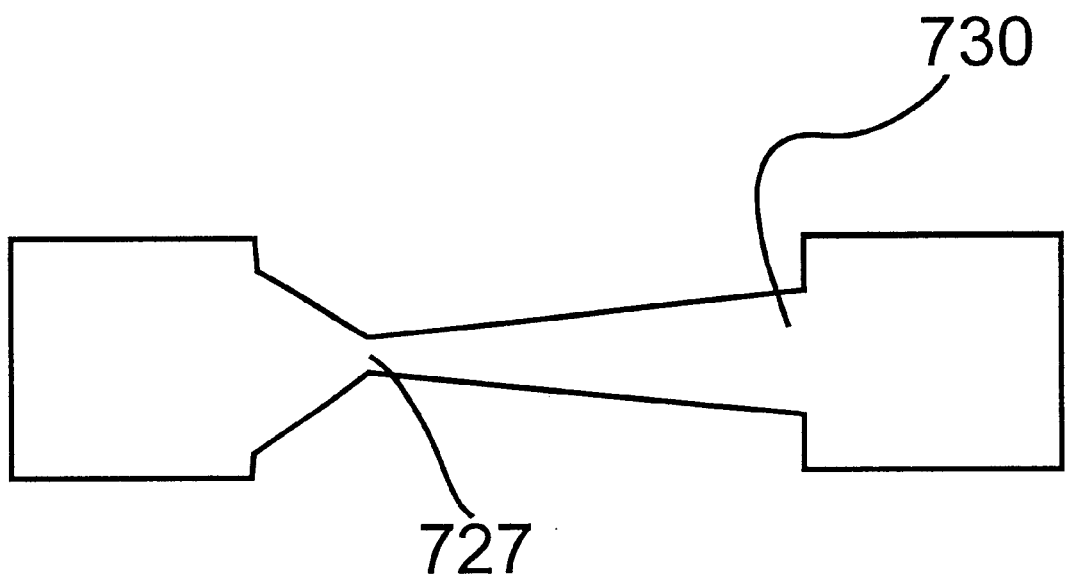
FIGS. 4A–F illustrate other NMPV shapes. Valve shape is indicated as mask outlines that would be used in certain silicon etching processes.
Figure 4B:
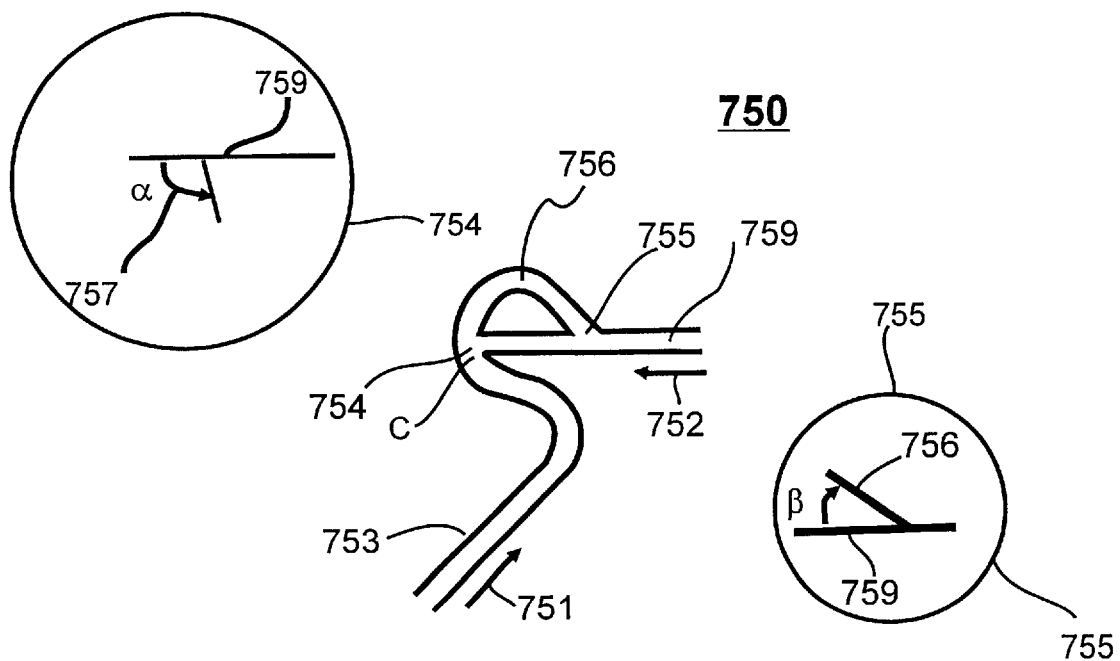

FIG. 4A illustrates a diffuser/nozzle valve shape. Diffuser/ nozzle valve 726 is shaped so that fluid flow is restricted less in the forward direction (from nozzle 727 to diffuser 730, from left to right in FIG. 4A) than in the reverse direction. The substantial length of the valve from the nozzle end (narrow or restricted end 727) to the diffuser end 730 acts to diffuse fluid flow in the forward direction. The substantial length of the valve from diffuser end (wider end) to the throat acts as a nozzle for accelerating the fluid. The forward diffused flow is subject to a lower amount of pressure loss than is the reversed, nozzled flow. Additional description of diffuser/nozzle valves for use in diaphragm pumps can be found in A. Olsson et al. (1995) supra p.291–294,; A. Olsson et al. (1996) supra p.87–91; A. Olsson et al. (1996) supra p. 479–484; Olsson et al. (1997) supra p.161–166; as well as in A. Olsson et al. (1997) "Diffuser-element design investigation for valve-less pumps," Sensors and Actuators A (Physical) A57(2): 137–42; A. Olsson et al. (1996) "Micromachined diffuser/nozzle elements for valve-less pumps," Proceedings. IEEE, The Ninth Annual International Workshop on Micro Electro Mechanical Systems. An Investigation of Micro Structures, Sensors, Actuators, Machines and Systems (Cat. No.96CH35856), IEEE, New York, N.Y., p.378–83.

FIGS. 4B–E illustrates alternative NMPV conduit designs. FIG. 4F illustrates the combination of two valves of FIG. 4D in series. Valves 750, 760, 770, and 780 are similar in design and have geometries in which the forward flow path (indicated in all four designs as 751) is directed through a conduit having curved and or straight portion, but no angles in the flow path equal to or greater than 90° (i.e. angles less than 90° ). In contrast, the reverse flow path (indicated by 752) has an angle in the reverse flow path equal to or more than 90°. Valves 750, 760, 770 and 780 are illustrated with a single branched section. As illustrated in FIG. 4F for valve 790 (combining two 770 valves), the valve conduits 750, 760, 770 and 780 can be combined in series to produce NMPVs.

Specifically, for valve design 750, the valve conduit has an inlet 753 and an outlet 759 portion and a branch portion 756. Inlet (753) and outlet portions (759) of the conduit meet, meet at 754 at an angle (α, 757) such that the reverse flow angle at this point 757 is about equal to or greater than 90°. The inlet and outlet portions can be curved or substantially straight channels. Valve 750 illustrates a curved inlet portion and a straight outlet portion. Valve 770 illustrates a straight inlet and a straight outlet portion. Valves 750 and 770 have a curved branch portion 756 extending from inlet portion 753 downstream (toward the outlet) of the meeting point 754 and curving to join the outlet portion 759 downstream (indicated by 755) of meeting point 754 at an angle β (758) of less than about 90°. The angles α and β are illustrate external to the valve diagram in FIGS. 4B and 4D.

Figure 4C:
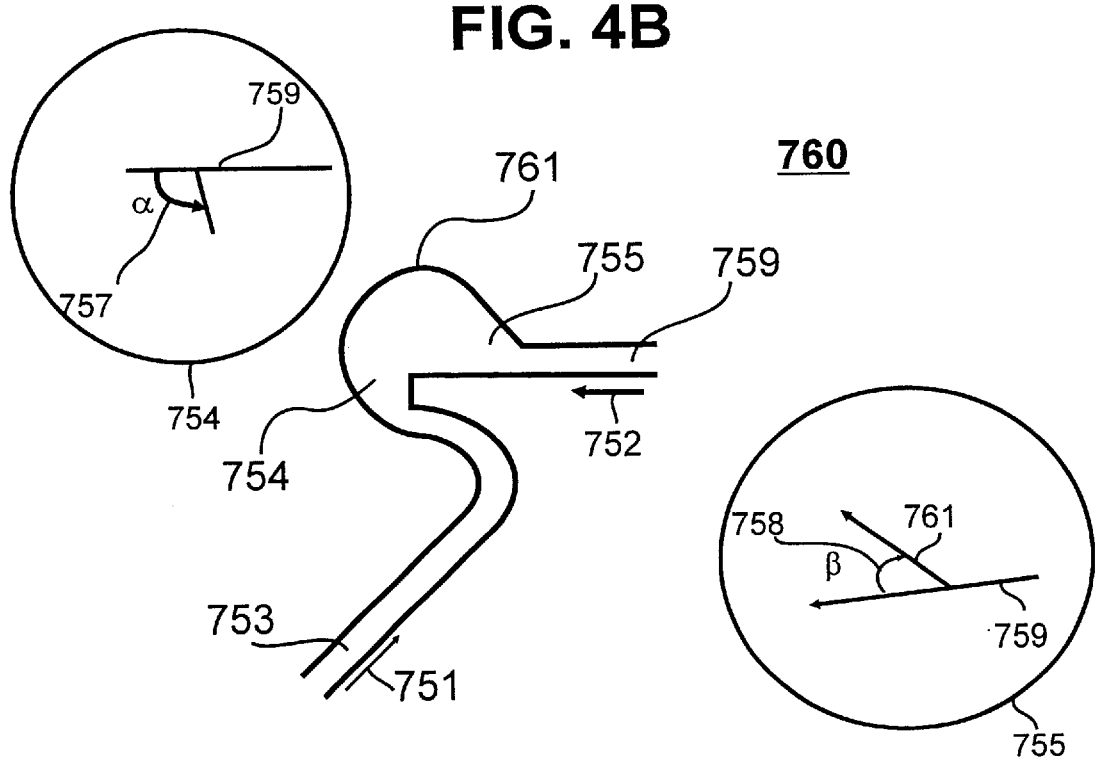
Figure 4D:
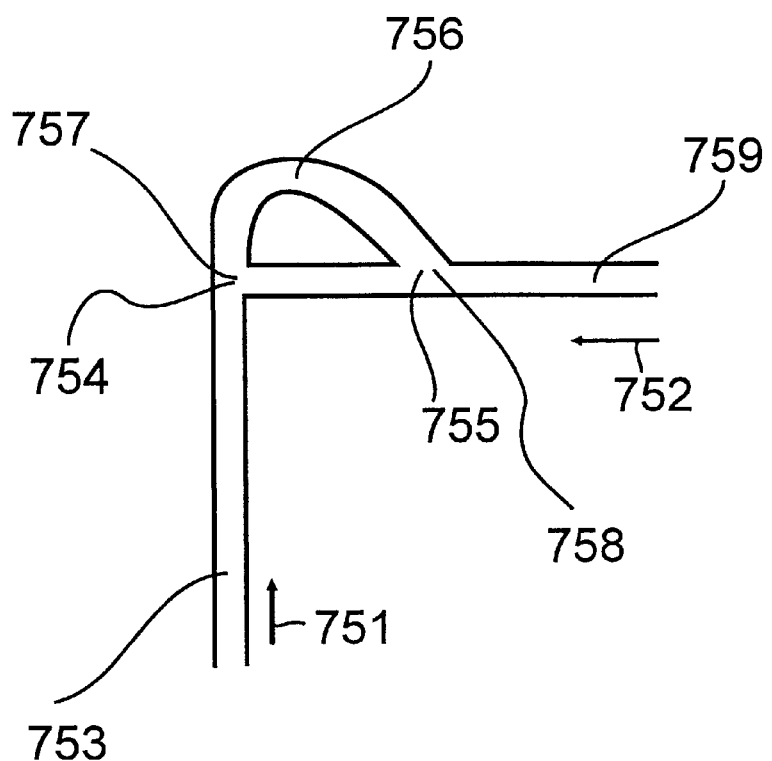
Figure 4E:
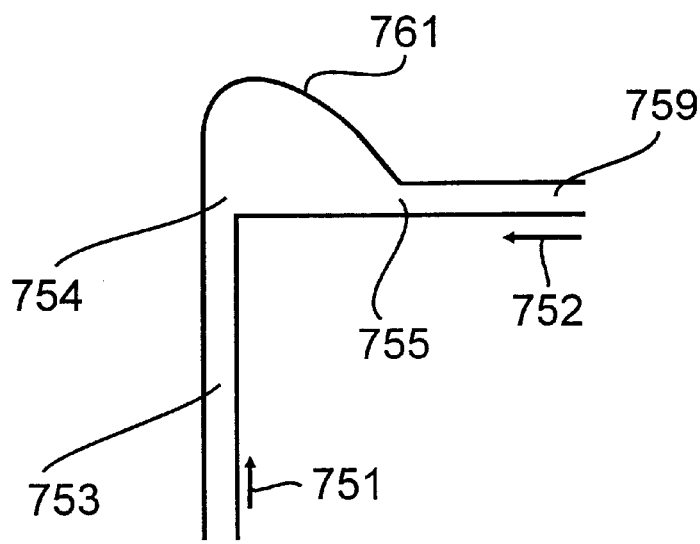
Figure 4F:
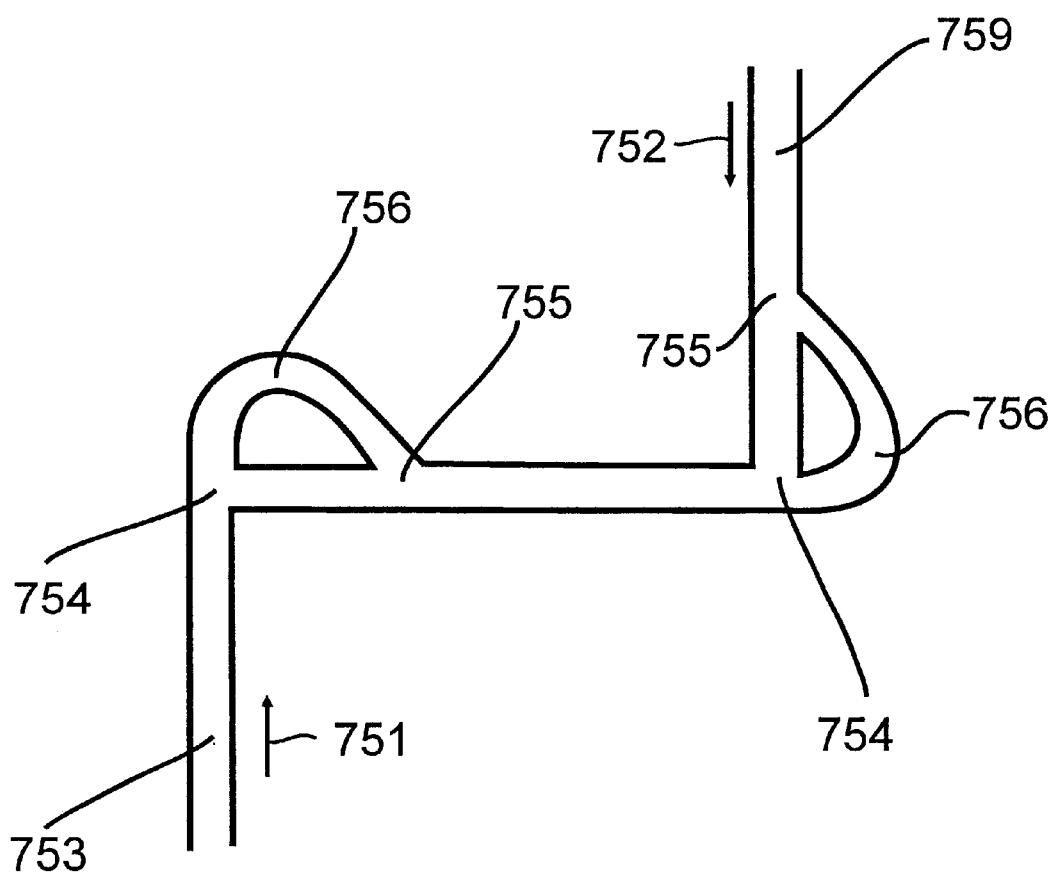

The valves of FIGS. 4C and E are similar to 4B and 4D, respectively. These valves do not have a branch. Instead the channel is expanded between the inlet and outlet portions to have a wider channel with curved sidewalls. The angle α between the direction of the inlet and outlet channels in these valves is about 90° or larger and the curved sidewall of the expanded channel 761 meets the outlet portion at an angle of less than about 90°. Valves having the branch channel are preferred over those having the curved sidewall.

Inlet and outlet valves of different configurations (shapes) may be combined in a single pump. A single pump chamber can have more than one inlet and/or outlet valve. Pumps can combine more than one pump chamber operated in-phase, in anti-phase or with different periodic cycles. Pumps can be designed to have two diaphragms, one at the top and one at the bottom surface of the pump chamber.

The pump cavity is preferably a circular disk and its volume is characterized by a cavity diameter and a depth. The depth of the cavity can be varied without significant loss of function so long as there is sufficient clearance for diaphragm deflection.

This invention is based at least in part on the development of a linear systems model for the NMPV micropumps of this invention. A linear frequency-domain model was developed that accurately predicts the frequency response of the pump system given the characteristics of the pump components and the pump load. The system model includes characterization of pump components such as diaphragm stiffness and mass (including the piezoelectric driver and electrical characteristics of the driver element), chamber fluid inertance and capacitance, valve resistance and inertance, and load capacitance, inertance and resistance.

It may not be possible to independently determine the characteristic parameters of individual pump components experimentally in a complete pump. Numerical values for such characteristics can be obtained by modeling each individual component based on known selected geometry or by paramters that can be experimentally determined. Component models employed to generate intput parameters for the pump performance model were verified experimentally with a re-assembleable test fixture (RTF) that allowed substitution of individual components of the micropump. The RTF was designed to enable the use of different combinations of diaphragms (of different materials or thicknesses), pump chambers and inlet and outlet connections, with or without valves.

In addition to the RTF, two prototype pump designs were investigated to better understand how various parameters affect pump performance. The two designs are termed "stiff; and "flexible," and consisted of pump chamber diameters of 6 mm and 10 mm with glass cover plate thicknesses (diaphragm thicknesses) of 500 $\mu$m and 150 $\mu$m, and piezoelectric driver elements of 3.8 and 6 mm, respectively.

Figure 5:
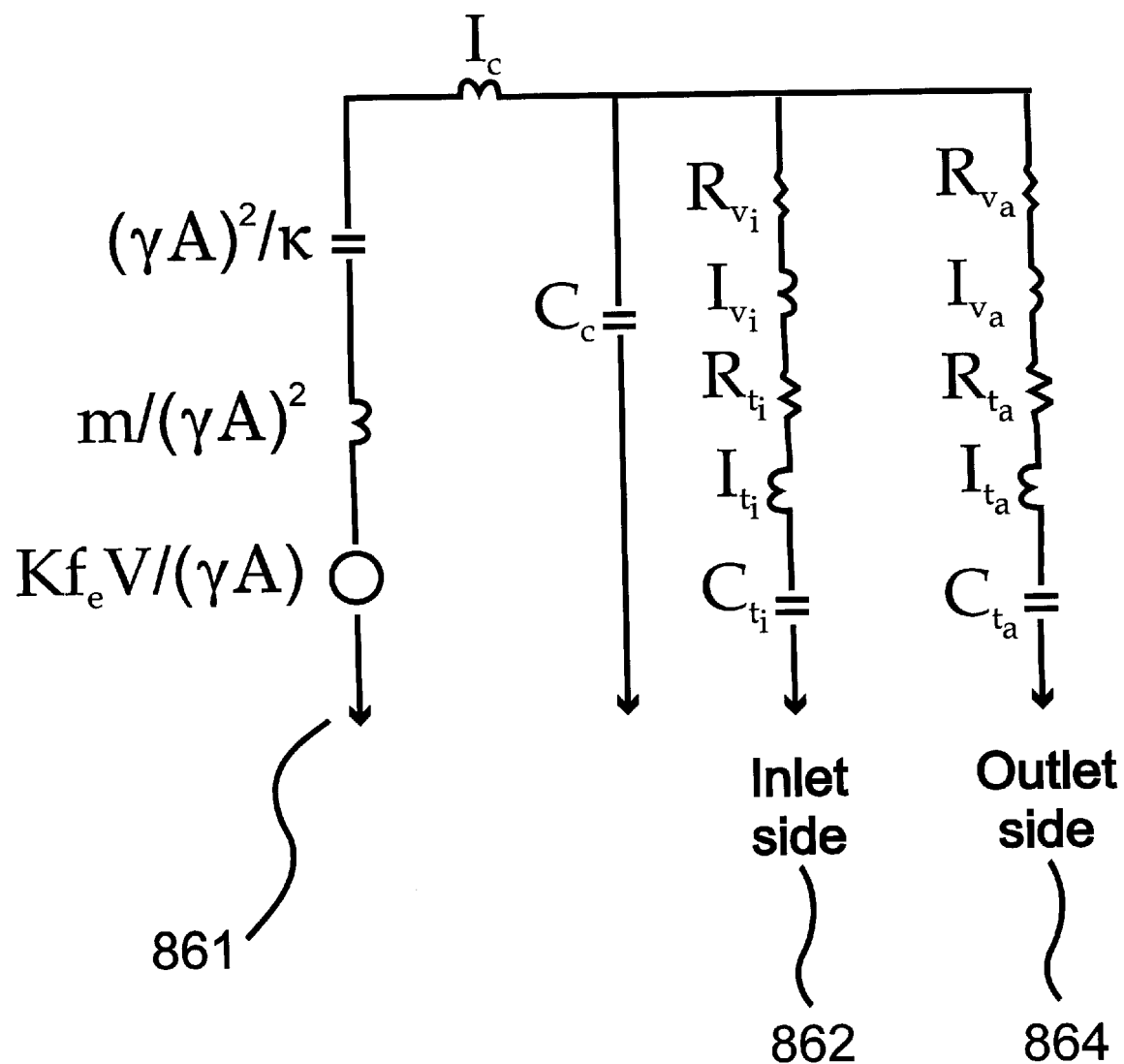
FIG. 5 is a circuit diagram for the linear system model of this invention.

A circuit diagram for the linear system model, as shown in FIG. 5, was developed in pressure and flow units. In this figure, the left loop (861) includes the mechanical and electrical elements of the diaphragm as well as the chamber hydraulic elements. See Table 1 for definitions of nomenclature used in the equations.

The applied pressure was:

$$kf_{ev}/(\gamma A)$$

diaphragm inertance was:

$$m/(\gamma A)^2$$

and the diaphragm capacitance was:

$$(\gamma A)^2/k$$

The circuit branches on the right in FIG. 5 (862 and 864) represent the hydraulic elements of the input and outlet valves and tubes.

The system model is represented by five governing equations eqns 1–3, 4A–B and 5. The force applied to the system by the piezoelectric transducer equalled the mechanical and pressure forces on the diaphragm, eqn. 1:

$$kf_e V = m\frac{d\dot{W}_c}{dt} + k\int \dot{W}_c dt + \gamma AP \tag{1}$$

The pressure on the diaphragm was reduced by the inertance of the fluid in the chamber, eqn.2:

$$P = I_c \frac{dQ_c}{dt} + P_c \tag{2}$$

The chamber pressure depended upon the capacitance of the chamber and the chamber flow rate (i.e., volume rate swept by the diaphragm minus the inlet and outlet flows), eqn.3:

$$P_c = \frac{1}{C_c} \int Q_c - Q_i - Q_o \, dt \tag{3}$$

Equations 4A and B represent the pressure drops across the valve and tubing in the inlet or outlet path, respectively. The same equation was used for both inlet and outlet, matching the experimental conditions. The pump chamber pressure equals the sum of the pressure drops in the inlet path:

$$P_c = (R_v + R_t)Q_i + (I_v + I_t)\frac{dQ_i}{dt} + \frac{1}{C_t}\int Q_i dt \tag{4A}$$

$$P_c = (R_v + R_t)Q_o + (I_v + I_t)\frac{dQ_o}{dt} + \frac{1}{C_t}\int Q_i dt \tag{4B}$$

The valve resistance and inertance for each valve flow direction was set to an average value in order to develop a linearized set of equations to determine frequency response of the system. The resulting equations were then solved in the frequency domain assuming steady-state harmonic behavior for the applied voltage and the output quantities of interest System response functions for the output parameters $P_c$, $W_c$, $Q_c$, and $Q_o$, relative to a unit input voltage, were determined as a function of frequency using MAPLE (Trademark, Waterloo Maple Software). Numerical results were obtained with MatLab(The Math Works, Inc.).

To provide parameters for the system model, individual pump component models were developed. The diaphragm was modeled as a bimetal disk with differential expansion surrounded by an annular disk with fixed support on its outer periphery (Roark and Young (1975) *Formulas for Stress and Strain*, 5th Ed., Table 24, Cases 1e, 2e, 5e, 10a, 13a and 15 a). The deflection per volt, $f_e$, was calculated by replacing the thermal expansion coefficient with the voltage coefficient of the piezoelectric disk. The diaphragm stiffness, k, was determined from the predicted deflection to an applied pressure.

Unlike a piston, the diaphragm surface does not have a uniform amplitude since its edges are fixed; thus the entire mass is not accelerated equally. The combined mass of the diaphragm and piezoelectric disk was modeled as an effective mass by shape factors applied separately to the piezoelectric disk and the diaphragm. The shape factors assumed a cosine shape for diaphragm deflection and integrated from center to outer radius of the diaphragm, or outer radius of the piezoelectric disk.

$$\gamma = \frac{\text{effective mass}}{\text{actual mass}} \tag{5}$$

$$\gamma = \frac{2\pi}{A} \int \frac{r_o}{2}\left(1 + \cos\left(\frac{r\pi}{r_o}\right)\right) dr$$

The effective mass, m, was then determined:

$$m = (\gamma m_{actual})_{PZT} + (\gamma m_{actual})_{membrane} \tag{6}$$

The chamber capacitance model contained terms representing the compressibility of the pumped liquid, the compressibility of air trapped in the pump chamber, and, for the RTF only (due to its flexible chamber material), the distension of the circumferential chamber walls:

$$C_c = \frac{Ah_c}{K} + \frac{\hat{V}_a}{nP} + C_{housing} \tag{7}$$

The chamber inertance was calculated from the height (depth) chosen to be 60 μm and area of the pump chamber and the density of the fluid (liquid water was used in exemplified calculations).

$$I_c = \frac{\rho h_c}{A} \tag{8}$$

The valve resistance model assumed laminar flow and integrated the resistance along the valve channels:

$$R_v = \frac{128\mu L}{\pi d_H^4} = \frac{8\mu}{\pi} \int \left(\frac{1}{h_v(x)} + \frac{1}{w_v(x)}\right)^4 dx \tag{9}$$

The valve inertance model considered the variation of valve channel width and height:

$$I_v = \rho \int \frac{dx}{h_v(x) w_v(x)} \tag{10}$$

The specific valve model illustrated in these equations is a diffuser/nozzle valve. The model can be adapted for rectifier valves and other NMPVs. However, an alternate and preferred method has been developed for modeling valve inertness and resistance.

A numerical method for deriving NMP valve impedance has been developed, based on an extension of analytical methods for channels of non-varying cross-section. This method has been described in R. L. Bardell and F. Forster (1998) "Impedances for Design of Microfluidic Systems" in *Proceedings of the Micro Total Analysis Systems '98 Work-* shop (Workshop held in Banff, Canada, October 1998) Kluwer Academic Publishers Dordrecht, Netherlands p. 299–302 which is incorporated by reference in its entirety herein.

Analytical models for lumped-parameter fluid elements for simple, straight channels are available for steady laminar flow [F. M. White, *Viscous Fluid Flow, 2nd ed.,* p. 120. John Wiley and Sons, 1991.] But these models are less preferred for separated flow, in which recirculation regions appear downstream of a change in the cross-sectional flow area, (eg. cavities, projections, T and Y-junctions), as has been demonstrated experimentally in flows with Reynolds numbers as low as Re=0:41 [S. Taneda *Journal of the Physical Society of Japan,* vol. 46, p. 1935, 1979.]

In addition to separated flow, microfluidic components may also experience unsteady flow from sources such as pumps and opening or closing valves. An example is the oscillatory flow experienced in no-moving-parts (NMP) valves used in micropumps [F. Forster, R. Bardell, M. Afromowitz, N. Sharma, and A. Blanchard, "Design, fabrication and testing of fixed-valve micro-pumps," in *Proceedings of the ASME Fluids Engineering Division,* pp. 479–484, 1995.] In this case, if the oscillations are sinusoidal and the valve diodicity is small, the forced response of a pump with NMP valves can be approximated once the fluid impedance of the valves is known.

At the micro-scale, analytical methods can be replaced by numerical simulation with computational fluid dynamics (CFD), because realistic flows are laminar, and the exact governing equations can be solved.

A three step process was followed to numerically calculate the impedance of an NMP valve with oscillating, separated laminar flow. First, a transient numerical solution method was developed to match an existing analytical solution for a straight channel with oscillating pressure boundaries. Second, a CFD valve model was developed, and its computational grid refined based on steady-flow experimental data. Third, the transient numerical method of the first step was combined with the computational grid of the second step to predict fluid impedance in an NMP valve. In the first step, existing analytical solution for oscillating flow in a 2-D channel [R. L. Panton, *Incompressible Flow,* pp. 279–283. John Wiley and Sons, 1984] was used to demonstrate fluid impedance could be calculated from a transient CFD simulation.

As the radian frequency of the oscillations, $\Omega$, increases, the viscous diffusion length becomes small compared to the height of the channel, 2h, and the flow in the center of the channel is no longer in phase with the flow near the wall. This is the case if the dimensionless parameter, $$\lambda = h \bigg/ \sqrt{\frac{\nu}{\Omega}} > 2.$$

The dimensionless solution for the velocity profiles is:

$$U = \sin T - \sin(T-\eta)e^{-\eta} \qquad (11)$$

where:

$$U = \frac{u}{\frac{\Delta P}{\rho L \Omega}}, T = \Omega t, \eta = \frac{\lambda}{\sqrt{2}}(1-Y), Y = \frac{y}{h}$$

where u is velocity, $\rho$ is fluid density, L is channel length, t is time, and y is cross-stream location.

A finite-volume method code, (CFX-F3D 4.1c, AEA Technology, www.aeat.com/cfx), was used for the CFD simulations. The discretization algorithms used for the velocities were central differencing where the mesh Peclet number, (the ratio of local convection to viscous diffusion coefficients), Pe=u $\Delta$x/v<2, and upwind differencing where Pe>2. Central differencing was used for the pressure [CFX 4.1, *User Guide,* pp. 117–129. Computational Fluid Dynamics Services, 1995.] The time-stepping scheme was time-centered Crank-Nicolson with time steps equal to 30° phase angles. Decreasing the time step size by a factor of 3 did not affect the solution.

Since both the pressure gradient and the flow rate were sinusoidal, the forced response of the oscillating flow was modeled, using the electrical/hydraulic system analogy, as a resistor and inertance in series. The impedance Z, resistance R, and inertance I were determined in the complex plane from the amplitudes of the driving pressure gradient $\Delta P$, the resulting volume flow rate Q, and the constant phase angle $\theta$ of the pressure gradient relative to the flow rate.

$$Z(jQ) = R + j\Omega I = \frac{\Delta P}{Q}(\cos\theta + j\Omega\sin\theta) \qquad (12)$$

The velocity was integrated over a cross-section to determine Q.

In the second step, CFD simulations of NMP valves were developed to model steady, separated, laminar flow. Since the most important characteristic of valves is their diodicity, the accuracy of the computational grid, discretization, and boundary conditions was determined by comparing valve diodicities computed numerically with values obtained by driving steady flow through the valve with an infuser pump and measuring pressure drop across the valve. In steady-flow, the ratio of pressure to flow rate is the fluid resistance, R=$\Delta$P=Q. The valve diodicity is the ratio of the resistances, Di=$R_{reverse\,flow}$=$R_{forward\,flow}$. In the third step, the CFD valve model from step 1 was modified to use the time-stepping techniques from step 2. The simulation was run through 6 cycles, which ensured the velocity solution was periodic in time within 1%. Valve impedance was calculated with Eqn. 12. For a 1 mm long, 90 $\mu$m deep 2-D channel with a pressure gradient amplitude of 1 atm oscillating at 10 kHz, $\lambda$=11:28, which is high enough to cause a phase shift between the wall flow and center flow. The resistance and inertance per unit depth calculated from the numerical solution were R=6.83×10$^7$ Pa s/m$^3$ and I=1.194×10$^4$ Pa s$^2$/m$^3$, which are within 0.5% of the analytical solution.

A 3-D steady-flow simulation of a Tesla-type NMP (such as in FIG. 2) valve that has both a T-junction and a Y-junction was conducted. The regions with dormant or recirculating flow change dramatically depending on flow direction. The CFD calcuation of Di=1.69 is within 18% of the experimental value at 2000 $\mu$L/min, a typical RMS flow rate during pump operation. Grid independence was demonstrated by a less than 1%change in the calculated mass flow rate when grid density was varied by 20%.

Direct measurement of the chamber pressure in a pump with NMP valves has shown that sinusoidal excitation of the pump results in a sinusoidal pressure gradient in the valves [F. Forster, R. Bardell, M. Afromowitz, N. Sharma, and A. Blanchard, "Design, fabrication and testing of fixed-valve micro-pumps," in *Proceedings of the ASME Fluids Engineering Division,* pp. 479–484, 1995.]. Thus, the transient NMP valve simulation used oscillating pressure boundaries at the typical system resonance (3085 Hz) of a 10 mm diameter pump with this Tesla-type valve (120 $\mu$m etch depth), resulting in λ=8.14 based on the hydraulic radius, and a phase shift between wall and center flows. The oscillating-flow impedance for a pressure amplitude of 0.5 atm was calculated by Eq. 12 as R=2.70×10$^{11}$ Pa s/m$^3$ and I=6.65×10$^7$ Pa s$^2$/m$^5$. These values are within 20% of standard lumped-parameter approximations of resistance based on Pousielle flow [F. M. White, *Viscous Fluid Flow*, 2nd ed., p. 120. John Wiley and Sons, 1991] and inertance based on ρL=A, where A is the cross-sectional area of a straight rectangular channel of equivalent length, width, and aspect ratio. We have shown that transient computational techniques can be used to determine fluid impedance in a channel of arbitrary geometry exhibiting flow separation and oscillation. In the case of NMP valves, impedance values enable selection of pump components and valve geometries to optimize the magnitude and quality of the system resonance, resulting in a higher-performing micropumps [R. Bardell, N. Sharma, F. Forster, M. Afromowitz, and R. Penney, "Designing high-performance micro-pumps based on no-moving-parts valves," in *Microelectromechanical Systems* (MEMS), DSC-Vol. 62/HTD-Vol. 354, pp. 47–53, ASME IMECE, 1997.], and facilitating their incorporation into general fluidic systems.

The type of NMPV and the valve channel width and height are generally selected in a given pump design to achieve a target outlet flow rate. The model of this invention does not optimize valve design.

Bench tests were performed to validate the component model equations (5)–(10). All tests were performed with room temperature deionized water that was filtered to 0.2 μm and degassed by vacuum pump to approximately 2500 Pa. The RFT and the 10 mm diameter pumps were primed with methanol, electrically activated, and visually checked for bubbles. The pumps were then flushed with filtered, degassed water. The same procedure was used for the 6 mm pump except that it was primed with water instead of methanol (the adhesive used was incompatible with use of methanol). While the pumps were activated, the diaphragm displacement per volt was monitored, and additional degassed water was added until reduction in displacement per volt ceased, which was taken as an indication that air bubbles associated with pump filling had been removed. In the RTF, instantaneous cavity pressure was measured with a 2.1 mm diameter strain gage pressure transducer. Sine-wave voltage excitation was used for all tests.

The RFT was initially assembled as a PZT-activated diaphragm in free air. From measurement of this assembly the diaphragm resonance, $\omega_n$, and the displacement per volt, $f_e$ were obtained:

$$f_e = \frac{\dot{W}_{c_a}}{\omega V} \quad (13)$$

The instantaneous pump diaphragm velocity was measured with a laser vibrometer,

A water-filled pump chamber without valves or tubes was added to the RTF, and diaphragm velocity and chamber pressure were measured to verify the analytical diaphragm model's prediction of diaphragm stiffness, k:

$$k = \frac{\omega P_{c_w} \gamma A}{(\dot{W}_{c_a} - \dot{W}_{c_w})} \quad (14)$$

Both the stiff pump example and the flexible pump example were excited at the same low frequency (50 Hz) at which inertial effects were determined to be negligible.

Additional verification of the diaphragm model was obtained by subjecting the stiff pump to various pressures and voltages, and measuring the diaphragm centerline deflection with a profilemeter. The predictions for $f_e$ were within 12% of the measured values at 100V excitation at 50 Hz.

The chamber capacitance, $C_c$, was determined from the amplitudes of the instantaneous chamber pressure, $P_c$, and chamber volume, (i.e., effective diaphragm area timed deflection):

$$\frac{\gamma A W_{c_w}}{\omega} \quad (15)$$

$$C_c = \frac{\gamma A}{\omega P_c} \dot{W}_{c_w}$$

These measurements were taken with the water-filled RTF with no inlet or outlet valve. The chamber capacitance model correlated with experimental results when an air volume, $V_a$ in eq. (7), equal to 0.1% of the chamber volume was used for calculation of the capacitance apparently due to air trapped in the chamber. This value of capacitance was assumed in all exemplified calculations.

The diaphragm mass and shape factor models were verified from the resonant frequency, $\omega_n$, of the same RTF diaphragm in free air:

$$m = \frac{k}{\omega^2_n} \quad (16)$$

The chamber inertance model was verified from the resonance of the sealed, water-filled RTF pump chamber as described above:

$$I_c = \frac{k + \frac{\gamma^2 A^2}{C_c}}{\gamma^2 A^2 \omega_n^2 - \frac{m}{A^2}} \quad (17)$$

For verification of the valve flow resistance model, the pressure drop across an entire pump (across both valves) was measured with a mercury manometer while flow was forced through the pump by a calibrated, constant-velocity, gear driven diffusion pump.

$$R_v = \frac{\Delta P}{Q} \quad (18)$$

The valve inertance model was not correlated due to the lack of a reliable experimental methodology.

The results of the model validation confirmed the applicability of the pump component models for determination of the system parameters in the linear system model.

Figure 6:
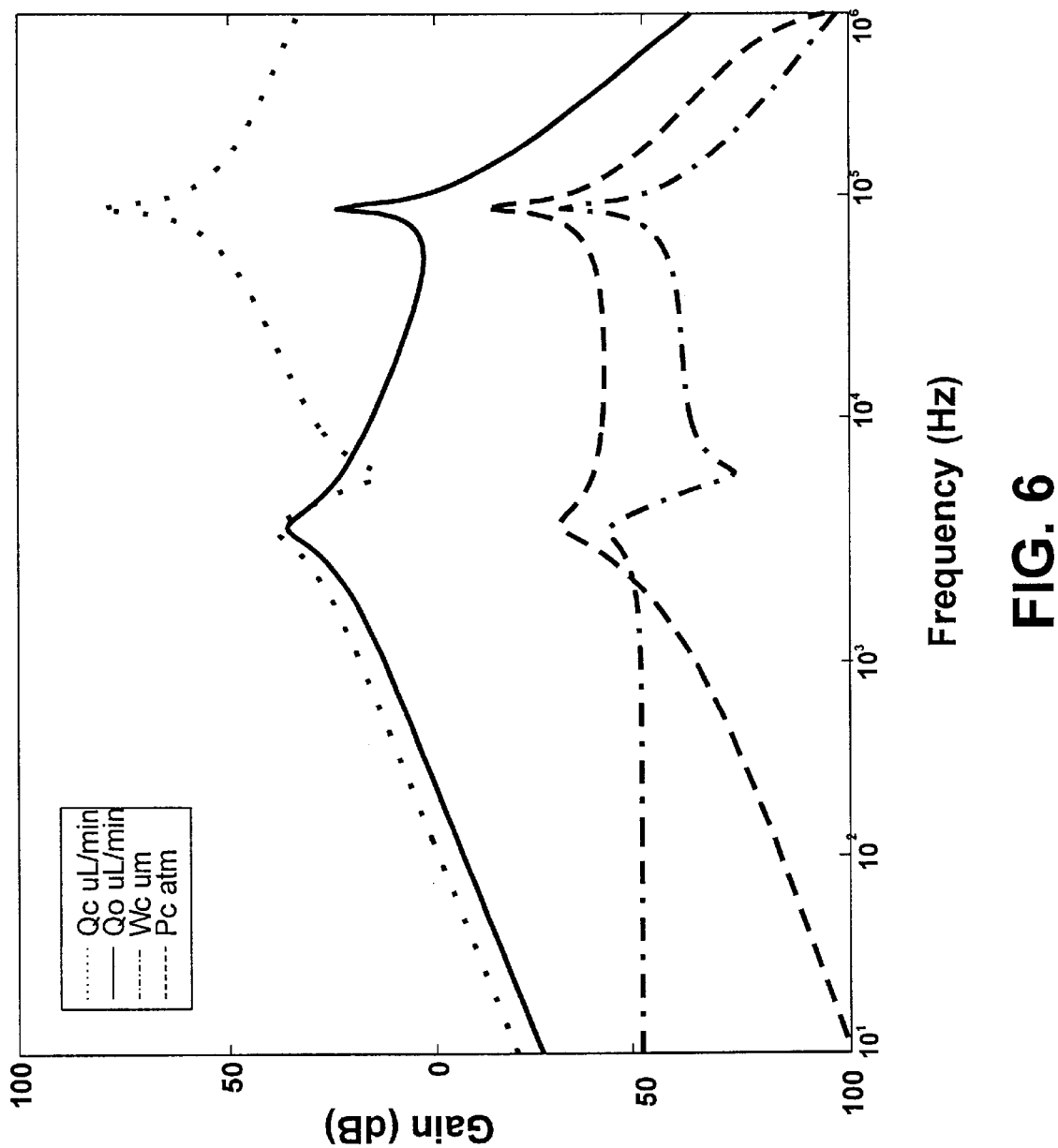
FIG. 6 is a graph of the frequency response functions calculated using the model of this invention for the stiff pump (STIFF=6 mm diameter with 500 μm diaphragm thickness) design example. The graph shows peak amplitudes/volt of diaphragm displacement $W_c$(•-•-•), chamber flow rate $Q_c$ (rate of change of chamber volume, •••••), outlet valve flow rate, $Q_o$ (—) and chamber pressure $P_c$ (---), where 0 Db=1 unit/volt. The derivation of $Q_o$ from $Q_c$ above the first resonance is due to capacitance of the pump chamber and fluid therein. Below the first resonance, the 6 dB difference is accounted for by the fact that $Q_O$ is flow through the outlet valve only and that there are two valves/pump.
Figure 7:
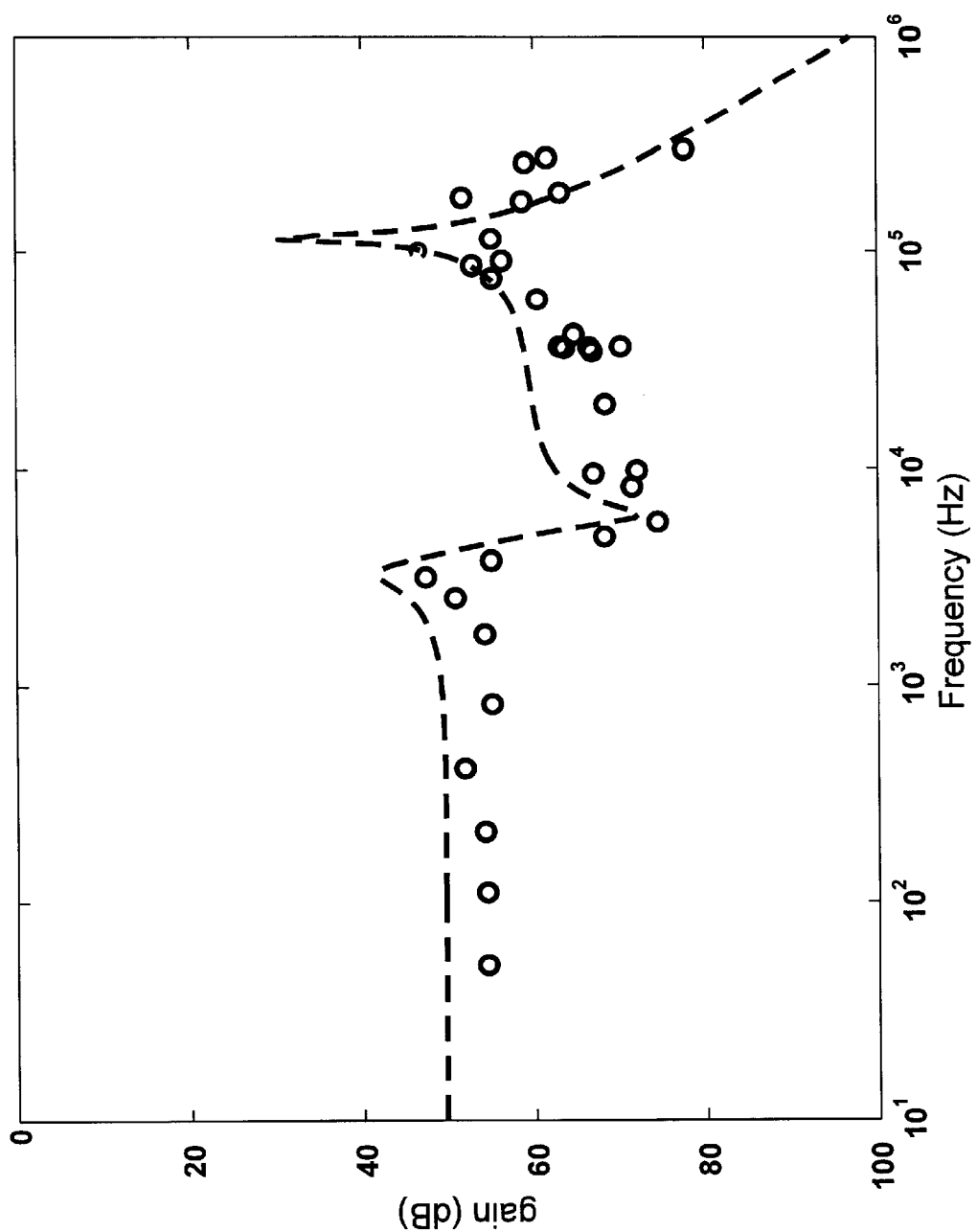
FIG. 7 is a graph comparing peak centerline diaphragm displacement $W_c$ calculated (dashed line) using the linear systems model of this invention with experimentally measured values (circles) for the example stiff pump.
Figure 8:
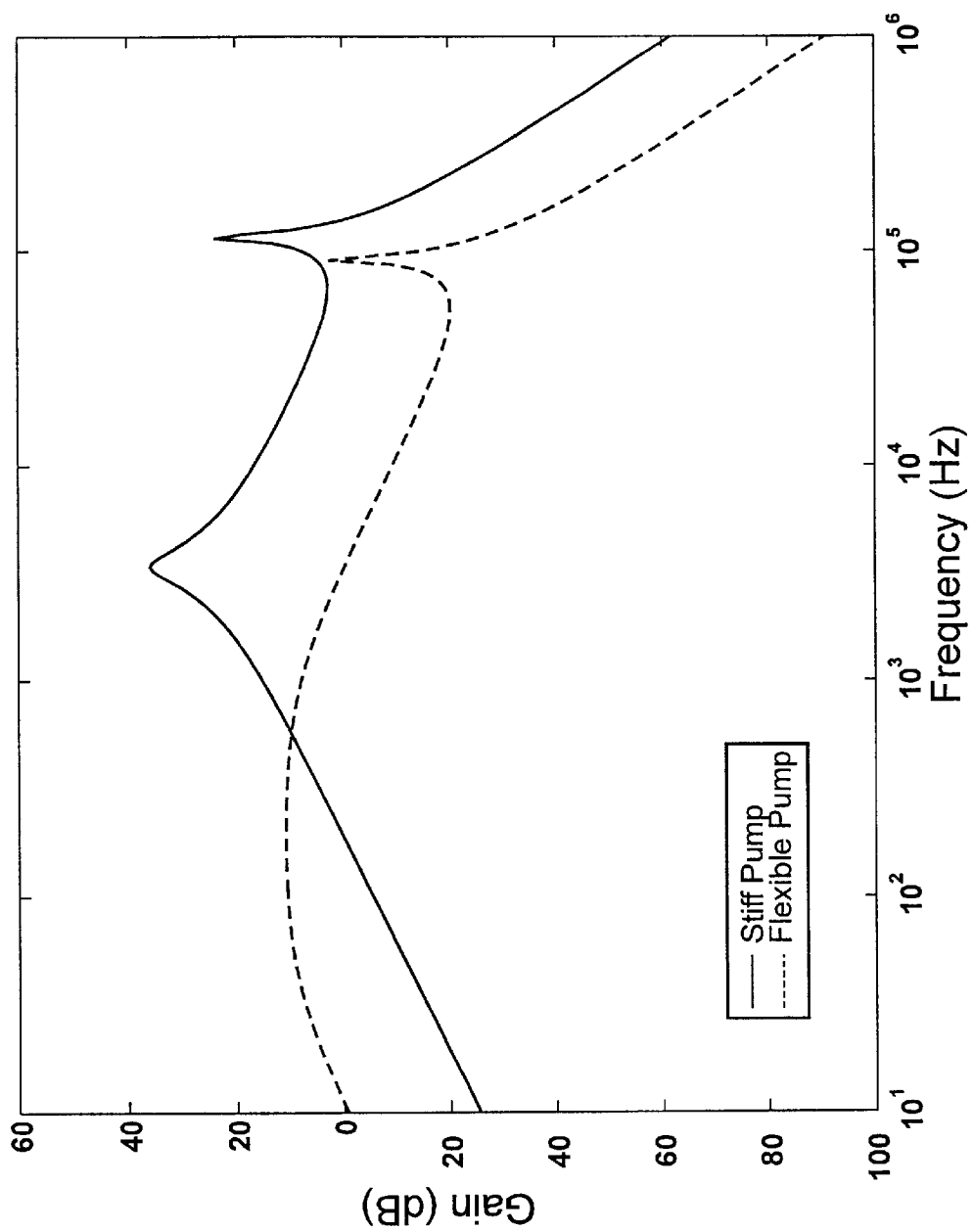
FIG. 8 is a graph comparing calculated peak outlet flow rate for the stiff pump example and the flexible pump example.

The linearized system transfer functions (i.e., the linear system model) were used to determine the outlet volume flow rate $Q_o$, the diaphragm swept volume rate $Q_c$, the diaphragm centerline deflection $W_c$, and the pump chamber pressure $P_c$. In FIGS. 6–8 values are normalized per volt applied to the accuator, e.g. outlet volume flow rate $Q_o$ is plotted as μL/min/volt, and 0 dB correponds to 1 μL/min/volt.

Results of such a calculation for the example stiff pump (6 mm pump with 500 μm thick glass diaphragm) are shown in FIG. 6. The calculation shows two resonance peaks. The higher frequency peak corresponds to the diaphragm resonance mode which is controlled primarily by the diaphragm mass and stiffness and to a lesser extent by chamber compliance. The lower frequency resonance corresponds to a chamber resonance which is a strong function of chamber compliance and fluidic parameters of the valves and connected tubing. Diaphragm pumps have typically been operated at the lower frequency chamber resonance to obtain maximum performance. $Q_o$ can have a significant amplitude at the higher frequency diaphragm resonance demonstrated in this work. In pump designs where performance is higher at the diaphragm resonance, it is preferred to operate the pump at the diaphragm resonance frequency. The difference between $Q_c$ and $Q_o$ at frequencies below the chamber resonance is 6 dB, which reflects that one half of the flow generated by the diaphragm deflection is directed out the outlet valve of the pump. At frequencies above the chamber resonance these curves diverge as valve inertance reduces outlet flow, and more flow is taken up by the total chamber compliance such as that due to the pumped liquid and trapped air.

Pump performance can generally be assessed by measurement of $Q_o$. However, $P_c$, e.g., as shown in FIG. 6, will also vary when pump parameters are varied. A pump will not operate when the pressure is high enough to cause cavitation. The use of $Q_o$ as a measure of pump performance is limited to a pressure range less than that which casues cavitation. Pump perforance can also be assessed in terms of pump pressure generated with the caution that cavitation must be avoided. Pump performance will be discussed in more detail below.

To validate the linear system model, the results of the model were compared to measured values in terms of diaphragm deflection $W_c$ as a function of frequency for the stiff pump design. The results of the comparison are shown in FIG. 7. The presence and location of both the diaphragm and chamber resonance peaks show good agreement between the model and experiment. For the calculated curve all system parameters were determined from the correlated component models, except for the uncorrelated valve inertance model and the compliance due to air in the working fluid, the fluid itself and the pump structure. Following the results of the RTF testing of the compliance model, the chamber compliance as represented by an air volume equal to 0.1% of the chamber volume. The agreement between the predictions using the compliance model and experiment is good. The exact volume of trapped air bubbles may, however, depend on the exact pump priming protocol used.

The linearized system transfer functions were solved using parameters appropriate for each of the example designs, the "stiff" pump (pump cavity diameter 6 mm, glass diaphragm thickness 500 $\mu$m) and the "flexible" pump (pump cavity diameter 10 mm, glass diaphragm thickness 150 $\mu$m). FIG. 8 compares the system model predictions of output volume flow rate $Q_o$ per unit input excitation voltage amplitude versus frequency for each example pump. Each curve exhibits two resonance peaks: the higher frequency corresponding to the diaphragm resonance and the lower frequency resonance corresponding to the chamber resonance.

Figure 9:
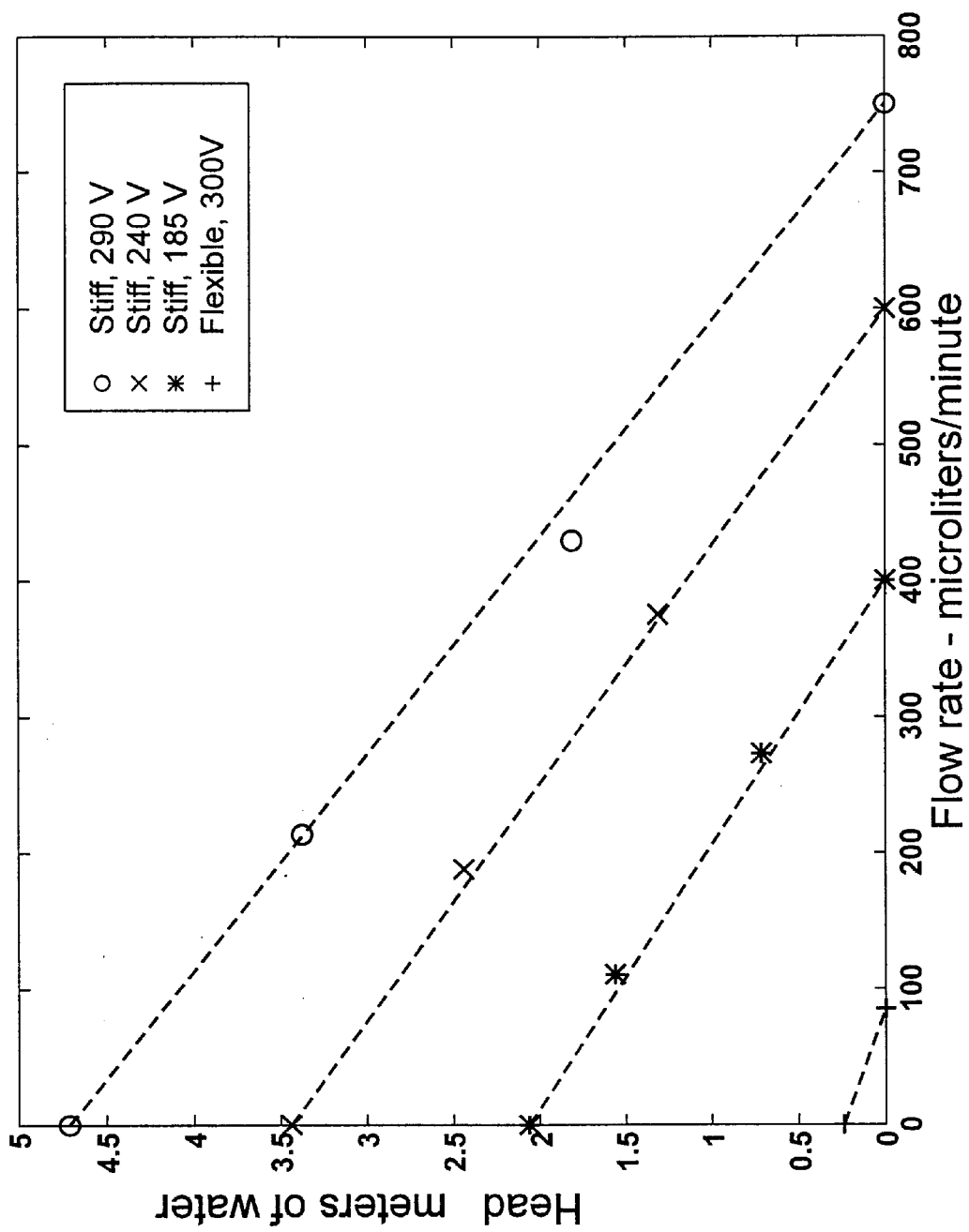
FIG. 9 is a graph of performance curves for the stiff or flexible pump example at several voltages where Stiff, 290 V=○; Stiff, 240 V=x; Stiff, 185 V=*; and Flexible, 300 V=+. The performance curve is a plot of pump head pressure in m $H_2O$ as a function of flow rate.

The amplitude at the chamber resonance represents the largest amplitude over all frequencies considered. This point corresponds to the frequency at which an actual pump should produce the maximum output. The difference between the two example designs at this optimum frequency is predicted as approximately 25 dB. This agrees well with the maximum flow rates of 750 and 85 $\mu$L/min, or 19 dB, obtained experimentally for the stiff and flexible pumps, respectively, as shown in FIG. 8. Performance curves (graphs of pump head in m of $H_2O$ vs. flow rate ($\mu$L/min)) for the stiff pump are given for three different excitation voltages (290, 240 and 185 V for the stiff pump) in FIG. 9. The performance curve for the flexible pump is only given at the highest voltage (300 V). At all voltage levels shown, the stiff pump performed significantly better than the flexible pump.

Figure 10:
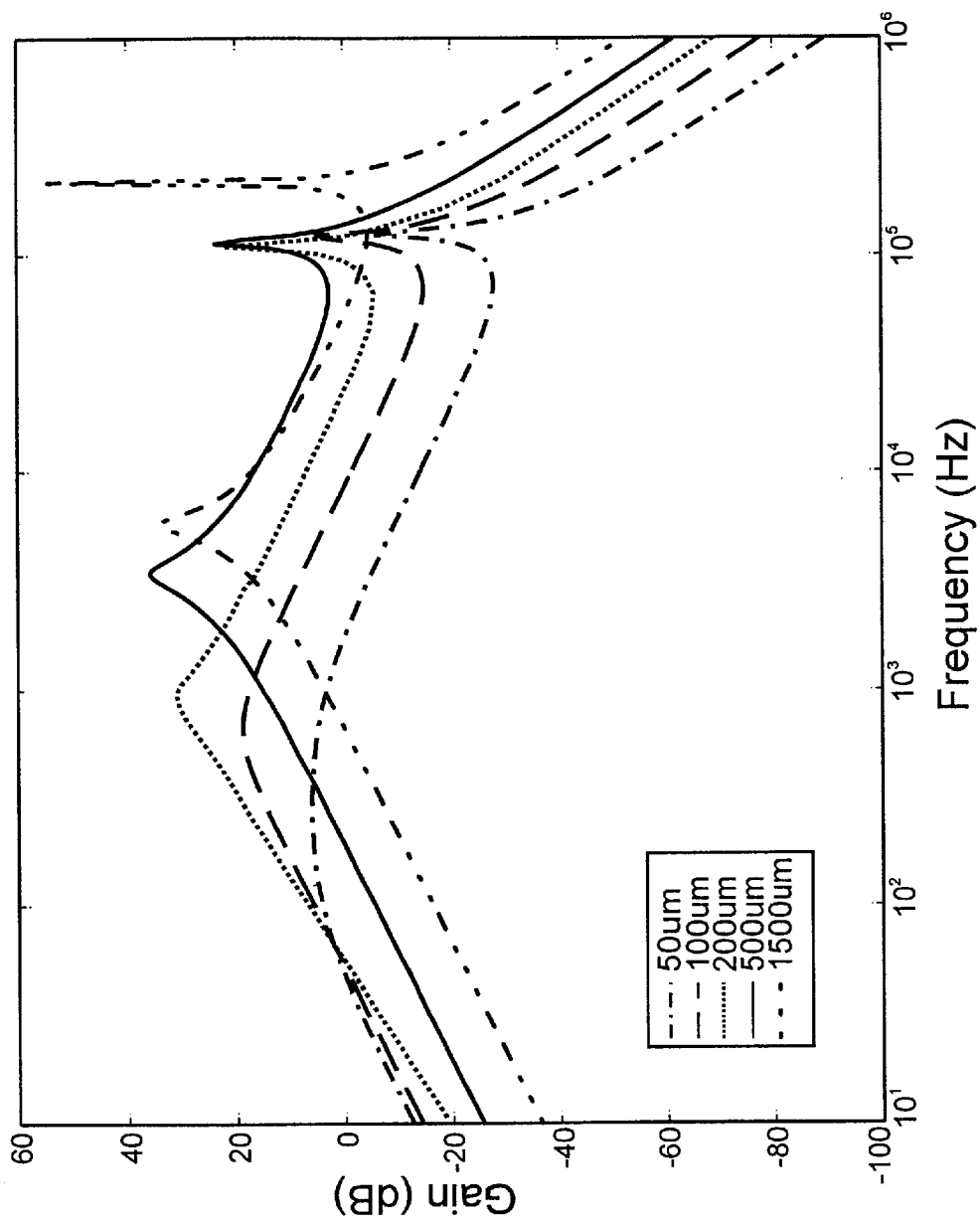
FIG. 10 is a graph illustrating the results of an optimization study for selecting the optimal diaphragm thickness to achieve a maximum outlet flow rate $Q_o$ for a 6 mm diameter pump cavity. Comparison of the graphed curves for different diaphragm thicknesses indicates that a 500 μm thickness yields maximum performance based on the chamber resonance when other parameters are held constant.
Figure 11:
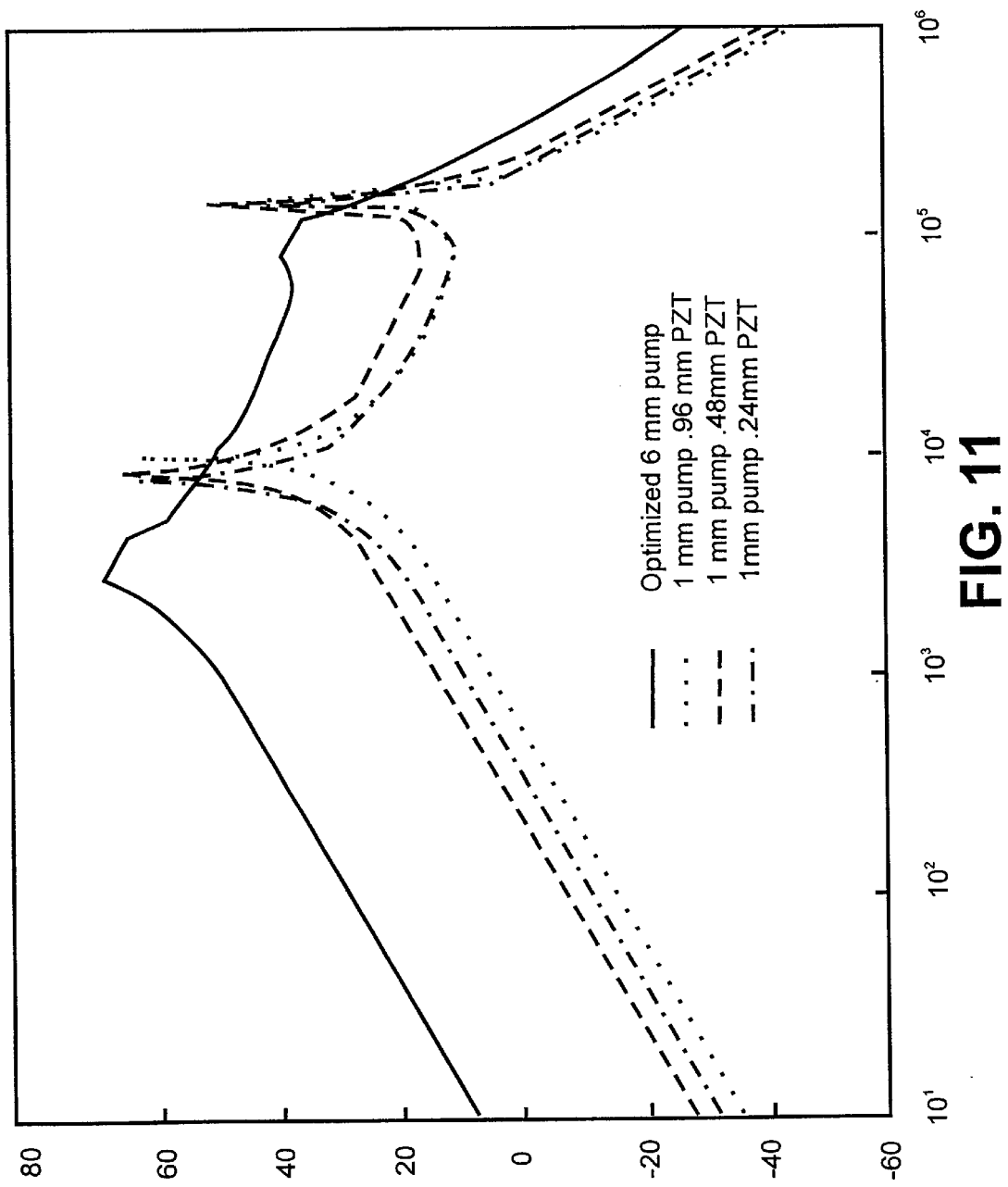
FIG. 11 is a graph illustrating the results of an optimization study for selecting the optimal piezoelectric transducer diameter for a 1 mm cavity micropump to achieve a maximum outlet flow rate $Q_o$. Comparison of the graphed curves for different diameters indicates that a 0.48 mm μm diameter yields maximum performance when other parameters are held constant. The curves for the several 1 mm pump variants are compared to an optimized 6 mm pump.

FIGS. 10 and 11 demonstrates the application of the method of this invention by applying the llinear frequency response model as a pump design tool for selection of design parameters for the construction of micropumps. In general a design is optimized by varying one parameter at a time and determining the improvement of the system response (i.e., the pump performance).

Shown in FIG. 10 is a parametric study showing how the outlet volume flow rate $Q_o$ (one measure of pump performance) as a function of frequency is affected by changes in the glass diaphragm thickness for a pump of pump cavity diameter of 6 mm and with all other pump parameters held constant. For a completely optimized design the size (thickness and diameter) of the PZT element can also be varied with diaphragm thickness. In the example illustrated in FIG. 10 piezoeletric transducer thickness and diameter were selected to be 190 $\mu$m and 50% of the diameter of the pump cavity, respectively.

Using the model herein as a design tool resulted in a dramatic improvement from a previous "flexible" pump design (10 mm pump cavity with 150 $\mu$m diaphragm thickness) with a maximum head pressure of about 0.24 m of $H_2O$ to a "stiff" design with a maximum head pressure of about 4.75 m $H_2O$, a twenty-fold increase in performance, where flow rates increased from 85 to 750 $\mu$L/min, a nine-fold increase.

FIG. 10 shows the peak output volume flow rate $Q_o(f)$ per unit applied voltage as a function of diaphragm excitation frequency for a number of diaphragm thicknesses for a 6 mm diameter pump without regard for limitations imposed by cavitation effects. If the pressure at which cavitation occurs is denoted by $\kappa$, then the voltage at which cavitation in the pump chamber occurs is given by:

$$\frac{\kappa}{P_c(f)}$$

where $P_c(f)$ is the amplitude of the chamber pressure per unit applied voltage as a function of frequency. Such a pressure curve is shown as FIG. 6 for a diaphragm thickness of 500 $\mu$m. In addition, there is also a maximum voltage $V_{max}$ that can be applied to a given piezoelectric element. (Application of voltages above that limit can result in depolarization of the element.) Thus, the maximum output flow rate amplitude that can be practically achieved at any frequency in view of these limits is;

$$Q_{o_{max}}(f) = \min\left(\frac{\kappa}{P_c(f)V_{max}}, 1\right) \times Q_o(f) \quad (19)$$

A value of $\kappa$=1 atm. represents a liquid (incompressible fluid) that cavitates at a perfect vacuum, which corresponds approximately to very pure water under ideal conditions. This case represents the minimal effect of cavitation on pump performance. A value of $\kappa$=0.5 atm. represents a more typical case of a liquid such as water that has not been degassed extensively and/or has some impurities that can act as cavitation sites.

The maximum electric field that can be applied to a piezoelectric element ($E_{depoling}$) is on the order of $10^6$ volts/m, which for a piezoelectric element having a thickness of 190 μm, as used herein, $V_{max}$ is about 180 V. In practice, a lower voltage than $V_{max}$ is generally used to avoid potential damage to the piezoelectric element or as required by other components of the electronics used. A typical practical value for $V_{max}$ is about 150 V.

FIG. 11 illustrates the application of the method of this invention to the design of a micropump having a cavity diameter of 1 mm. Specifically, the figure illustrates the effect of variation of the diameter of the piezoelectric transducer on pump performance. In the illustrated case, net flow rate $Q_{net}$ is optimized. The net flow for a pump with a valve of a particular diodicity ($D_i$) depends on the flow through the outlet valve $Q_o$ $$Q_{net} = Q_o \left( \frac{D_i^n + 1}{D_i^n - 1} \right) \quad (20)$$

Two limitations are included when predicting $Q_o$: cavitation of the fluid and the maximum electric field, (E depoling) that can be applied to the piezoelectric disk without depoling it. Cavitation is predicted when the pressure in the pump chamber ($P_c$) is larger than the cavitation pressure (κ) leading to $κ/P_c < 1$. Different piezoelectric disk thicknesses ($t_p$) will reach their depoling voltage (Vmax), when $Vmax = E_{depoling} t_p$. Applying these limitation to the prediction of $Q_o$ results in the following equation where the minimum of the two quantities multiplies $Q_o$.

$$Q_{cutoff} = \min\left( \frac{κ}{P_c}, V_{max} \right) Q_o \quad (21)$$

Thus, in order to plot the net flow predictions of a variety of pump designes on a single plot, $Q_o$ is converted to $Q_{cutoff}$ converting the prediction from a microliter/minute/volt basis to a microliter/min basis. FIG. 11 is a plot of $Q_{cutoff}$(dB) vs frequency (Hz) where 0 dB corresponds to 1 μL/min. This plot compares an optimized 6 mm diameter pump with three design variants of a 1 mm pump. The diameter of the piezoelectric actuator is varied to optimize pump performance. The highest flow rate of these 1 mm designs is obtained by using the middle diameter (0.48 mm) and the flowrate of this 1 mm pump with optimized actuator diameter already approaches the flowrate of the much larger 6 mm diameter pump even though all other design parameters have not yet been optimized.

Once a final set of design parameters have been chosen the perferred operating frequency of the pump is determined from the location of the maximum value of Q cutoff on the plot.

The specific model and equations exemplified herein utilize certain parameter values. The model in general assumes the use of low diodicity NMPVs in the pump. The specific equations and examples presented correspond to a circular disk-shaped pump cavity and diffuser/nozzle valves of certain size. The model also utilizes a circular disk of piezoelectric material having certain chosen thickness and diameter (relative to the diameter of the pump cavity). The calculations and examples also assume that the fluid being pumped is liquid water.

The model can be readily generalized without undue experimentation in view of the guidance provided herein and in view of principles well-known in the art to pump cavities of other shapes (e.g., ellipse-shaped cavities), to pump cavities of varying depth, to NMPVs of other designs and sizes, to PZT of other relative sizes and thicknesses and for pumping of other fluids including both liquids and gasses.

The linear systems model of this invention achieves significantly higher pump performance for a given choice of NMPV by selecting the characteristics of various pump components to increase the amplitude of the system response at one of the system resonance frequencies. In particular, the model directs the selection of an optimized diaphragm thickness for a given pump cavity diameter to achieve improved pump performance and facilitates construction of pumps with optimized performance.

The specific examples herein show optimization for $Q_o$ (with the understanding that pump pressure can not exceed that which causes cavitation of the pump). Cavitation is a particularly important consideration when incompressible fluids, i.e., most liquids and liquids containing particles, are being pumped. Pumps can also be optimized for $P_c$. The model can be employed to optimize for a given aspect of performance or a given target range of performance parameters.

The linear systems model of this invention was developed to evaluate the effects of a complete set of pump components on pump performance over a range of excitation frequencies that included all system resonance frequencies. Table 2 lists input parameters into the linear systems model by category as chamber parameters, membrane parameters, valve parameters and tubing parameters. Scheme 1 is a flowchart for the method of this invention indicating how input parameters are used for the model and method of this invention to obtain an output that is indicative of pump performance (e.g., a plot or plots of performance as a function of changing a selected parameter). The geometric parameters (e.g., membrane area and diameter, etch depth, etc.), materials parameters (e.g., membrane density, piezoelectric disk density, etc.) and physical parameters (e.g., bubble volume for which a reasonable assumption is made) listed in column I of Scheme 1 are directed input into the model equations (1–5) or are used as indicated in the scheme to calculated other parameters (e.g., valve inertance, membrane shape factor, etc.) listed in column II of Scheme 1. The methods by which the basic parameters of column I are employed to calculate the parameters of column II are discussed herein above. For example, CFD simulations as discussed herein above are used to obtain valve inertness and valve resistance based on valve geometry. Several parameters in column II, such as the membrane shape factor can also be experimentally determined in a given case. Parameters associated with the "tube" in Scheme 1, e.g., tube inertance, resistance and capacity, describe the connection of the pump (both inlet and outlet) to the world outside of the pump and its valves, e.g., fluid connectors to reservoirs. The parameters in column II are input into the model equations using any of a variety of known methods for solving ordinary differential equations (O.E.D.). The results of these calculations are plots of pump parameters as a function of a varied parameter. In principle, any one of the parameters of column II or column I can be varied to optimize pump performance. However, as is clear from Scheme 1 and the discussion herein several parameters may be coupled, e.g., etch depth will affect both chamber properties and valve properties in column II. Other factors other than pump performance may dictate the selection of a given parameter or parameters from column I, e.g., a certain diaphragm material may be required for a particular pump application. For a given selection of all but one of geometric and materials parameters of column I, the remaining one independent parameters can be varied to optimize pump performance and allow optimization of that parameter. An interactive process using the model and method herein can be employed to optimize several geometric and./or materials parameters for a given pump design.

The linear systems model was validated by comparison of calculated performance parameters with experimental data. These comparisons showed that there was good agreement between the system model and the dynamic response of a high performance prototype pump. Good agreement with experiment was also demonstrated when the linear systems model was used to predict the relative performance of two example pump designs. Application of the model to pump design allows the optimization of pump performance and provides a method for designing a micropump to meet target performance levels. The model allows calculation of optimized pump structural parameters needed to obtain a target pump performance. In addition the linear system model of this invention can help determine operating performance under less than ideal conditions, such as in the presence of varying amounts of trapped air when pumping liquids, and allows optimization to achieve improved performance under such non-ideal conditions.

The linear systems model of this invention is exemplified for the optimization of micropumps with a single pump chamber with a single diaphragm. The model can be readily adapted using well-known principles for optimization of micropumps having more than one pump chamber, working in-phase or in anti-phase or working in other periodic cycles. The model can also be readily adapted for optimization of micropumps with two diaphragms, i.e. where the top and bottom surfaces of the pump chamber function as diaphragms. The model can also be employed to optimize micropumps with more than one inlet and outlet valve.

The method provided herein provides optimized geometry and materials parameters for the design and construction of micropumps. A variety of techniques are now available for construction of such optimized pump. For example, pump cavities and valves can be etched on silicon wafers using a deep reactive ion etching (DRIE) process to achieve precise control over the final etched shape in the valve region. Glass plates can be employed as diaphragms and can be anodically bonded over the etched cavity and valve conduits sealing the pump chamber and valve conduits. Additional details of construction using DRIE techniques are described in Forster et al. (1995) supra. Silicon/glass pump assemblies can be mounted on steel or aluminum backing plates (using Crystalbond 509, Aremco Products, Inc.).

The RFT used herein consisted of a number of independent components built up around a silicon pump chip. Diaphragms of stainless steal or brass shim stock ( 127 $\mu$m thick) were used. 190 $\mu$m thick piezoelectric disk (PZT) with a diameter about ½ the diameter of the pump cavity were bonded to the diaphragm with conductive silver epoxy. Pump bodies were machined from 6.25 mm thick plexiglas with a 10 mm diameter hole for the pump chamber. Inlet and outlet holes, as needed (depending upon the property being tested) were drilled in the plexiglass and # 18 gauge blunt tip needles were inserted and bonded in place. The diaphragm, pump body, and etched pump chip were pressed together by an outer assembly and the plexiglas acted as its own gasket.

Those of ordinary skill in the art recognize that a variety of methods, techniques and materials are available and known in the art for the construction of micropumps including micromachining or micromolding methods. These methods can be readily applied using the information obtained form the methods disclosed herein to construct micropump with optimized pump performance.

All of the references cited herein are incorporated in their entirety by reference herein.

TABLE 1

NOMENCLATURE

| | |
|---|---|
| A | Area of diaphragm |
| C | Capacitance |
| I | Inertance |
| K | Bulk Modulus of working fluid |
| L | Length of channel |
| P | fluid pressure, gage |
| $\Delta P$ | Pressure drop across valve |
| Q | Volume flow rate |
| R | Resistance |
| V | Driving voltage on piezoelectric element |
| $\hat{V}$ | Volume |
| $W_c$ | Diaphragm centerline deflection |
| $\dot{W}_o$ | Diaphragm centerline velocity |
| $d_H$ | Hydraulic diameter |
| fe | Diaphragm centerline deflection per volt |
| h | Height |
| k | Diaphragm stiffness |
| m | Effective mass of diaphragm, see Eq. (6) |
| n | Ratio of specific heats |
| $r_o$ | Radius of diaphragm |
| $w_v$ | Width of valve channel |
| $\gamma$ | Shape factor of diaphragm |
| $\mu$ | Absolute viscosity |
| $\omega, \omega_n$ | Radian frequency, resonance |
| $\rho$ | Density of fluid |
| ( )a ( )w | Subscript for fluid: air or water |
| ( )c ( )v ( )t | Subscript for component: chamber, valve, or tubing |

TABLE 2

Inputs to the Linear System Model

A. Chamber parameters $C_C$ fluid capacitance from Eqn. 7
   $I_c$ fluid inertance from Eqn. 8

B. Membrane parameters

A area of the membrane
   m effective mass from Eqn. 6
   $f_e$ centerline deflection per volt from the bimetal disk model explained in the "Component Models" subsection
   k stiffiiess from the bimetal disk model explained in the "Component Models" subsection
   $\gamma$ shape factor from Eqn. 5

C. Valve parameters $R_v$ resistance, see Eqn. 9
   $I_v$ inertance, see Eqn. 10

C1. Inputs to optimize pump design for a particular valve etch depth
   membrane diameter
   membrane thickness
   piezo thickness
   piezo diameter D. Tubing parameters $R_t$ resistance from Eqn. 9 where L is tube length and $d_H$ is the tube diameter
   $I_t$ inertance from pL/A where p is fluid density, L is tube length, and A is fluid cross-sectional area
   $C_t$ capacitance from the third term in Eqn. 7

SCHEME I

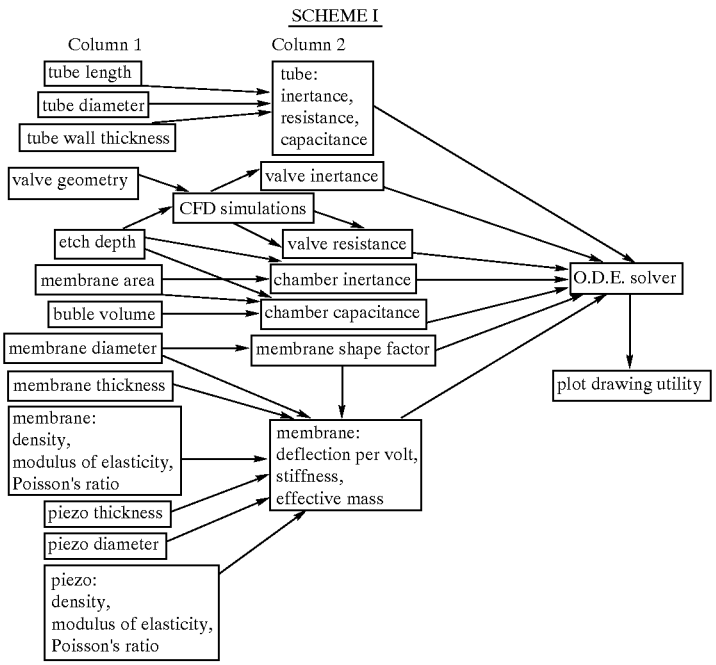

We claim:

1. A method for making a micropump having no-moving-parts valves wherein the micropump comprises:

(1) a pump cavity of a selected diameter with at least one deformable cavity diaphragm of a selected thickness and which together define a cavity volume;

(2) one or more inlet valves and one or more outlet valves in fluid communication with the pump cavity, each inlet valve being a conduit with no moving parts shaped such that fluid flow in the conduit is restricted less in the direction toward the pump cavity than in the direction away from the pump cavity and each outlet valve being a conduit with no moving parts and shaped such that fluid flow in the conduit is restricted less in the direction away from the pump cavity than in the direction toward the pump cavity; and (3) an actuator with a selected diameter which actuator is attached to the deformable cavity diaphragm to periodically change the cavity volume and to thereby pump fluid from each inlet valve through the pump cavity and through each outlet valve;

which comprises the steps of:

(a). selecting values for a geometric, materials, or other input parameter selected from the group consisting of valve geometry, pump cavity etch depth, diaphragm area, bubble volume, diaphragm diameter, diaphragm thickness, diaphragm density, diaphragm modulus of elasticity, Poisson's ratio of the diaphragm, thickness of the actuator, diameter of the actuator, density of the actuator, modulus of elasticity of the actuator, and Poisson's ratio of the actuator;

(b). calculating a first value of a pump performance parameter selected from the group consisting of pump cavity fluid pressure, diaphragm centerline deflection, the diaphragm swept volume flow rate, outlet volume flow rate and net volume flow rate using a linear systems model employing the selected input parameter values;

(c). varying the value of one or more of the input parameters;

(d). calculating the value of the selected pump performance parameter as a function of the varying input parameter or parameters;

(e). comparing the performance parameter calculated as a function of the varying input parameter or parameters to the first calculated value of the performance parameter to determine the values of the input parameter or parameters that result in optimized pump performance; and (f). employing the values of the input parameter or parameters obtained in step (e) to make the micropump.

2. The method of claim 1 wherein the linear system model is represented by equations 1–3, 4A, 4B and 5 as follows:

$$kf_e V = m\frac{d\dot{W}_c}{dt} + k\int \dot{W}_c dt + \gamma AP \qquad (1)$$

$$P = I_c \frac{dQ_c}{dt} + P_c \qquad (2)$$

$$P_c = \frac{1}{C_c}\int Q_c - Q_i - Q_o dt \qquad (3)$$

$$P_c = (R_v + R_t)Q_i + (I_v + I_t)\frac{dQ_i}{dt} + \frac{1}{C_t}\int Q_i dt \qquad (4A)$$

$$P_c = (R_v + R_t)Q_o + (I_v + I_t)\frac{dQ_o}{dt} + \frac{1}{C_t}\int Q_o dt \qquad (4B)$$

and $$\gamma = \frac{2\pi}{A}\int^{r_o} \frac{r_o}{2}\left(1 + \cos\left(\frac{r\pi}{r_o}\right)\right) dr. \qquad (5)$$

3. The method of claim 1 wherein the selected pump performance parameter is outlet flow volume or net volume of the pump.

4. The method of claim 3 wherein the input parameter that is varied is the diameter of the actuator.

5. The method of claim 4 wherein the actuator is a piezoelectric element.

6. The method of claim 4 wherein the value of the diameter of the piezoelectric element is varied between about 25% to about 95% of the diameter of the pump cavity.

7. The method of claim 1 wherein the input parameter that is varied is the thickness of the diaphragm to obtain a value that provides for optimal pump performance.

8. The method of claim 7 wherein the value of the pump cavity diameter is not varied.

9. The method of claim 8 wherein the actuator is a piezoelectric transducer and the value of the diameter of the piezoelectric transducer is also varied to obtain a value for the diameter of the piezoelectric transducer that provides for optimal pump performance.

10. A method for making a micropump having no-moving-parts valves wherein the micropump comprises:
   (1) a pump cavity of a selected diameter with at least one deformable cavity diaphragm of a selected thickness which together define a cavity volume;
   (2) one or more inlet valves and one or more outlet valves in fluid communication with the pump cavity, each inlet valve being a conduit with no moving parts shaped such that fluid flow in the conduit is restricted less in the direction toward the pump cavity than in the direction away from the pump cavity and each outlet valve being a conduit with no moving parts and shaped such that fluid flow in the conduit is restricted less in the direction away from the pump cavity than in the direction toward the pump cavity; and
   (3) an actuator with a diameter ranging from about 25% to about 90% of that of the pump cavity diameter which actuator is attached to the deformable cavity diaphragm to periodically deform the diaphragm and as a result to periodically change the cavity volume and to thereby pump fluid from each inlet valve through the pump cavity and through each outlet valve;
   which method comprises the step of selecting the pump cavity diameter, the thickness of the diaphragm and the diameter of the diaphragm to maximize pump outlet flow.

11. The method of claim 10 wherein the actuator is a piezoelectric element.

12. The method of claim 10 wherein the micropump is fabricated in silicon by micromaching techniques.

13. The method of claim 10 wherein the inlet and outlet valves are rectifier valves.

14. A method for operating a micropump to pump an incompressible fluid wherein the micropump has a pump cavity of a selected diameter with at least one deformable cavity diaphragm of a selected thickness which together define a cavity volume; one or more inlet valves and one or more outlet valves in fluid communication with the pump cavity, each inlet valve being a conduit with no moving parts and shaped such that fluid flow in the conduit is restricted less in the direction toward the pump cavity than in the direction away from the pump cavity and each outlet valve being a conduit with no moving parts and shaped such that fluid flow in the conduit is restricted less in the direction away from the pump cavity than in the direction toward the pump cavity; and an actuator with diameter ranging from about 25% to about 90% of the diameter of the pump cavity and which is attached to the deformable cavity diaphragm to periodically change the cavity volume and to thereby pump fluid from each inlet valve through the pump cavity and through each outlet valve; which comprises the step of applying a periodic voltage change to said actuator at the diaphragm resonance frequency to operate the pump.

15. The method of claim 14 wherein the actuator is a piezoelectric element.

16. The method of claim 14 wherein the inlet and outlet valves are rectifier valves.

17. The method of claim 14 wherein the micropump has one deformable diaphragm.

18. An improved micropump of the type having a pump cavity of a selected diameter with at least one deformable cavity diaphragm of a selected thickness which together define a cavity volume; one or more inlet and outlet valves in fluid communication with the pump cavity, the inlet valve being a conduit with no moving parts and shaped such that fluid flow in the conduit is restricted less in the direction toward the pump cavity than in the direction away from the pump cavity and the outlet valve being a conduit with no moving parts and shaped such that fluid flow in the conduit is restricted less in the direction away from the pump cavity than in the direction toward the pump cavity; and an actuator with a diameter about 50% to about 95% of that of the pump cavity attached to the deformable cavity diaphragm to periodically change the cavity volume and to thereby pump fluid from the inlet valve through the pump cavity and through the outlet valve; wherein the improvement is that the diaphragm thickness and the pump chamber diameter are selected such that a maximal outlet flow rate is obtained.

19. A micropump which comprises a pump cavity of a selected diameter less than 6 mm with at least one deformable cavity diaphragm of a selected thickness which together define a cavity volume; one or more inlet and outlet valves in fluid communication with the pump cavity, each inlet valve being a conduit with no moving parts and shaped such that fluid flow in the conduit is restricted less in the direction toward the pump cavity than in the direction away from the pump cavity and each outlet valve being a conduit with no moving parts and shaped such that fluid flow in the conduit is restricted less in the direction away from the pump cavity than in the direction toward the pump cavity; and an actuator with a diameter about 50% to about 95% of that of the pump cavity attached to the deformable cavity diaphragm to periodically change the cavity volume and to thereby pump fluid from the inlet valve through the pump cavity and through the outlet valve; wherein the diaphragm thickness, piezoelectric transducer thickness and piezoelectric transducer diameter are selected such that a maximal outlet flow rate is obtained.

20. A micropump of claim 19 wherein the pump cavity diameter is about 3 mm or less.

21. A micropump of claim 19 wherein the pump cavity diameter is about 1.5 mm to about 0.5 mm.

22. A micropump of claim 19 which is fabricated in silicon by micromaching techniques.

23. A micropump of claim 19 which is fabricated using micromolding techniques.

24. A micropump of claim 19 which is optimized for pumping an incompressible fluid.

25. The micropump of claim 19 wherein the actuator is a piezoelectric element.

26. The micropump of claim 19 wherein the inlet and outlet valves are rectifier valves.

27. A method for making a micropump wherein the micropump comprises:
   (1) a pump cavity of a selected breadth and selected depth with at least one deformable cavity diaphragm made of a selected material and having a selected thickness and which together define a cavity volume;
   (2) one or more inlet valves and one or more outlet valves of known inertence and resistance;

(3) an actuator shaped for use with the selected pump cavity shape made of a selected material and having a selected breadth ranging from about 25% to about 90% of that of the pump cavity which actuator is attached to the deformable cavity diaphragm to periodically change the cavity volume and to thereby pump fluid from each inlet valve through the pump cavity and through each outlet valve;

which comprises the steps of:

setting a value for one of the input geometric or material parameters selected from the group consisting of pump cavity breadth, pump cavity depth, deformable pump cavity diaphragm material, deformable pump cavity diaphragm thickness, actuator breadth, and actuator thickness;

calculating a pump performance parameter selected from the group consisting of cavity fluid pressure, diaphragm centerline velocity, diaphragm swept volume flow rate, net volume flow rate and outlet volume flow rate as a function of varying each of the values of the input geometric or material parameters, except the value of the one set input geometric or material parameter;

comparing the calculated performance parameters as a function of varying input geometric or material parameters to determine optimized values of the varying input parameters; and selecting values for pump cavity breadth, pump cavity depth, deformable pump cavity diaphragm material, deformable pump cavity diaphragm thickness, actuator breadth, and actuator thickness of the micropump that provide desired pump performance as indicated by the comparison of calculated pump performance parameter;

and making the micropump such that the input geometric or materials parameters provide for desired pump performance.

28. The method of claim 27 wherein the pump performance parameter is calculated using a linear systems model.

29. The method of claim 27 wherein the inlet and outlet valves are no-moving-parts valves.

30. The method of claim 27 wherein the pump performance parameter is outlet volume flow rate.

31. The method of claim 27 wherein the pump performance parameter is calculated using the equations 1–3, 4A, 4B and 5 as follows:

$$kf_e V = m\frac{d\dot{W}_c}{dt} + k\int \dot{W}_c dt + \gamma AP \quad (1)$$

$$P = I_c \frac{dQ_c}{dt} + P_c \quad (2)$$

$$P_c = \frac{1}{C_c}\int Q_c - Q_i - Q_o dt \quad (3)$$

$$P_c = (R_v + R_t)Q_i + (I_v + I_t)\frac{dQ_i}{dt} + \frac{1}{C_t}\int Q_i dt \quad (4A)$$

$$P_c = (R_v + R_t)Q_o + (I_v + I_t)\frac{dQ_o}{dt} + \frac{1}{C_t}\int Q_o dt \quad (4B)$$

and $$\gamma = \frac{2\pi}{A}\int \frac{r_o}{2}\left(1 + \cos\left(\frac{r\pi}{r_o}\right)\right) dr. \quad (5)$$

* * * * *